United States Patent [19]

Chadima, Jr. et al.

[11] Patent Number: 4,723,208

[45] Date of Patent: * Feb. 2, 1988

[54] SYSTEM AND METHOD FOR COMMUNICATION BETWEEN NODES OF A CLOSED LOOP LOCAL COMMUNICATION PATH

[75] Inventors: George E. Chadima, Jr.; Joseph J. Kubler, both of Cedar Rapids, Iowa

[73] Assignee: Norand Corporation, Cedar Rapids, Iowa

[*] Notice: The portion of the term of this patent subsequent to Feb. 7, 2001 has been disclaimed.

[21] Appl. No.: 853,734

[22] Filed: Apr. 18, 1986

Related U.S. Application Data

[62] Division of Ser. No. 544,969, Oct. 24, 1983, Pat. No. 4,604,693, which is a division of Ser. No. 289,098, Jul. 31, 1981, Pat. No. 4,430,700.

[51] Int. Cl.$^4$ .............................................. G06F 13/38
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 4,007,441 | 2/1977 | Faber | 364/900 |
| 4,007,450 | 2/1977 | Haibt et al. | 364/200 |
| 4,176,401 | 11/1979 | Lonberger | 364/900 |
| 4,195,351 | 3/1980 | Barner et al. | 364/900 |
| 4,224,684 | 9/1980 | Conner et al. | 364/900 |
| 4,227,178 | 10/1980 | Gergaud et al. | 364/900 |

OTHER PUBLICATIONS

Bantz, D. F., "Decentralized Request Resolution Mechanisms", IBM Tech. Disclosure Bull., vol. 20, No. 2, Jul. 1977, pp. 853-855.

*Primary Examiner*—Thomas M. Heckler
*Attorney, Agent, or Firm*—Neuman, Williams, Anderson & Olson

[57] ABSTRACT

In an exemplary embodiment a transmission link coupler is provided at each node. In a transmission mode, the coupler provides a transmission path which transmits incoming messages directly to the node output without any processing step delay. In the decoupling mode of the coupler, the associated data processor still receives messages from the node input, but the direct path from the node input to node output is attenuated. During the sending of messages and responses thereto, the link couplers at the sending and responding nodes are operated so as to prevent the messages from making unattenuated multiple traverses of the loop communications path while also avoiding the occurrence at other nodes of a communications gap which would permit such nodes to interfere with the exchange of messages. The arrangement is such that each node can be implemented with low cost integrated circuitry. No common timing link is required between the nodes. Transmission of requests for control of communication and the actual transmission of desired information between the nodes may all take place via a single channel of the loop communication path.

24 Claims, 4 Drawing Figures

SYSTEM AND METHOD FOR COMMUNICATION BETWEEN NODES OF A CLOSED LOOP LOCAL COMMUNICATION PATH

CROSS-REFERENCE TO RELATED APPLICATIONS

This is a division of our copending application U.S. Ser. No. 544,969 filed Oct. 24, 1983, now U.S. Pat. No. 4,604,693 issued Aug. 5, 1986, which in turn is a division of our application U.S. Ser. No. 289,098 filed July 31, 1981, now U.S. Pat. No. 4,430,700 issued Feb. 7, 1984.

BACKGROUND OF THE INVENTION

The present invention relates to a system and method for communication between nodes of a closed loop local communication path.

Many efforts have been made to develop a ring type communications network because of the potential low cost and particularly because such a system can be implemented using fiber optic paths. Fiber optic data transmission is particularly attractive for a local communication system because of its immunity to electromagnetically induced noise.

The general objective of a ring distribution of processors is recognized, for example, in the text *Computer Networks and Distributed Processing*, by James Martin, Prentice-Hall, Inc., 1981, page 38, FIG. 3.2, the second illustration.

One of the traditional objections to such a ring type processing network relates to such a system wherein a central controller is required with a store and forward function with respect to each of the other nodes. In such a system, communication is dependent on the speed of operation of the central controller, and is less flexible because of the requirements that the central controller poll the recipient node prior to actual forwarding of the data. It would be desirable to avoid the use of a central controller not only for greater speed and flexibility of communication between the nodes of a closed loop communication path, but also to provide such a communication system where failure of a computer at one node would not prevent continued operation, as is the case where a central controller is present.

Other types of ring networks essentially involve a ring of data processing devices each of which must check an incoming message before forwarding it to the next node. In many check and forward systems communication is structured in relation to specified multiplex time slots or in relation to a circulating control message e.g. a so called token or "GO" control signal. In any event, complexity and added expense result from the necessity for recognizing the destination address of an incoming message within a processing cycle of brief time duration, and for selectively removing a message packet from the loop where the same originated at the local node and has traversed the loop. In one such proposed check and forward system, information was to be sent in individual packets eighteen bits in length including a total destination label size of eight bits, a data field of eight bits and start/stop bits.

SUMMARY OF THE INVENTION

Accordingly, an important object of the present invention is to provide a closed loop communication system including a series of nodes each of which may communicate with the others on a flexible basis without the requirement of a permanent network controller and without the use of the check and forward principle and without requiring a common timing for the series of nodes.

In accordance with an important feature of the invention, a particular method for effecting communication in such a closed loop communication path has been developed wherein data messages are propagated about the loop path without processing delays at the respective nodes and without restriction on the length of a given data message.

A further object of the invention is to provide a closed loop communication system and method which is extremely simple and economical and highly flexible in its adaptability to the needs of relatively small enterprises, for example individual restaurants, and which system can very readily be expanded as needed with minimal cost and downtime.

In accordance with one aspect of the present invention the nodes of a loop communication path initiate communication with other nodes by monitoring the loop communication path for a gap in communication along the loop communication path of a defined time span. Upon detection of such a communication gap, a node desiring to initiate communication, termed a bidding node, interrupts the loop by shifting a transmission link coupling means at the bidding node to a decoupling mode, and transmits a bid message about the loop. The nonbidding nodes upon receipt of the bid message respond by insuring that their transmission link coupling means are in coupling mode. The bidding node monitors the loop communication path for the bid message (which will traverse the loop and arrive at the bidding node if the transmission link coupling means of the other nodes along the loop are in the coupling mode). Upon a successful bid at a bidding node, a data message may be transmitted via the loop communication path while the transmission link coupling means at the bidding node is in the decoupling mode so as to effectively attenuate repeated traverses of the data message about the loop. At a recipient node upon receipt of the data message, the transmission link coupling means is placed in the decoupling mode, and a response is transmitted via the loop communication path. At the bidding node the transmission link coupling means is switched to the coupling mode to assure against a communications gap and then is placed in the decoupling mode. With this operation of the node configuration at each node, decentralized control can be effected without requiring a common timing reference for the nodes of a loop communcation path.

In accordance with another aspect of the invention, a node configuration for a loop network has transmission link coupling means for enabling data communication about the loop path without requiring a processing step delay at the node. Control means is associated with node data processing means for placing the associated transmission link coupling means in a decoupling mode during transmission of a data message from the data processing means. Said control means controls the transmission link coupling means to avoid introducing a communications gap of a predetermined time duration during reception of a response to the transmitted data message. In this way the response can circulate about the loop and prevent an undesired communications gap from being perceived at other nodes which may desire to transmit messages. This feature makes possible a decentralized loop communications network for data communications wherein data processing means at the nodes operate autonomously without requiring a supervisory control such as a common timing reference.

A highly significant concept leading to successful operation of a loop communication system as described herein was that of a control system embedded at the respective decentralized nodes such that one of the transmission link coupling means about the loop is maintained in a decoupling mode at all times to insure that unattenuated messages do not repeatedly traverse the loop communcations path. In a specific implementation of this concept, a bidding node seeking to initiate a data message and a recipient node transmitting a response coordinate the condition of their transmission link coupling means such that the bidding node prevents repeated circulation of a bid message or a data message originating therefrom while a recipient node prevents repeated circulation of its response message.

Other objects, features and advantages will be apparent from this detailed disclosure and from the appended claims.

DETAILED DESCRIPTION

Figure 1:
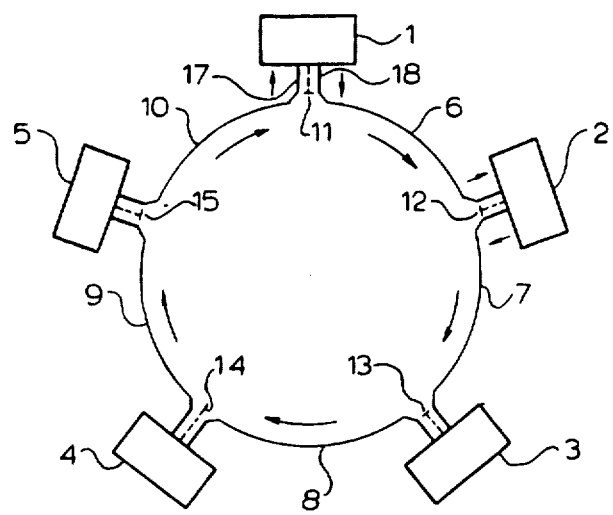
FIG. 1 is a diagrammatic view illustrating a ring type local computer network implemented in accordance with the system and method of the present invention.

FIG. 1 illustrates a ring type computer network comprising a series of nodes or stations 1 through 5. A loop communication path is provided by successive transmission links 6 through 10 and successive transmission link switches 11 through 15. The switches 11 through 15, in the illustrated embodiment, have a first mode wherein the associated incoming and outgoing transmission links are directly connected for the transmission of data without appreciable time delay, and have a second mode (indicated diagrammatically for switch 14) wherein the transmission link switch prevents a direct transmission of signal pulses from the incoming transmission link to the outgoing transmission link.

Each transmission link switch in FIG. 1 is diagrammatically indicated as having an incoming signal branching means for directing incoming signal pulses both to the transmission link switch path and also to an incoming signal receiving path such as 17. Similarly an outgoing signal junction is indicated for transmitting signal pulses to the outgoing transmission link either from the transmission link switch (when the transmission link switch is in its first transmitting mode) or from an outgoing signal sending path 18.

Considering a given station such as that at 1 in FIG. 1, if one of the other nodes (e.g. node 4) transmits a signal pulse, the pulse travels along the loop communication path via transmission links such as 9 and 10. If the transmission link switch 11 at node 1 is in the first transmitting mode, the signal pulse will be directly coupled to the outgoing transmission link 6 and for example may be again received at the sending node (e.g. node 4) after a time interval essentially dependent on the transmission velocity of the transmission links 6 through 10 and of the switches 11 through 15. As illustrated in FIG. 1, a sending node such as node 4 is to have its transmission link switch 14 in the second nontransmitting mode, so that the signal pulse traverses the loop path only once.

In a system in accordance with the present invention, each node may be provided with pulse amplification. Such pulse amplification may be provided at each transmission link switch path. Where the transmission links such as 6 through 10 are implemented as fiber optic transmission lines, it is convenient in the present state of the art to convert incoming light pulses into electronic form for amplification. In this case the transmission link switches such as 11 through 15 may be in the form of electronic switches interposed in series with electronic pulse amplification circuitry.

Figure 2:
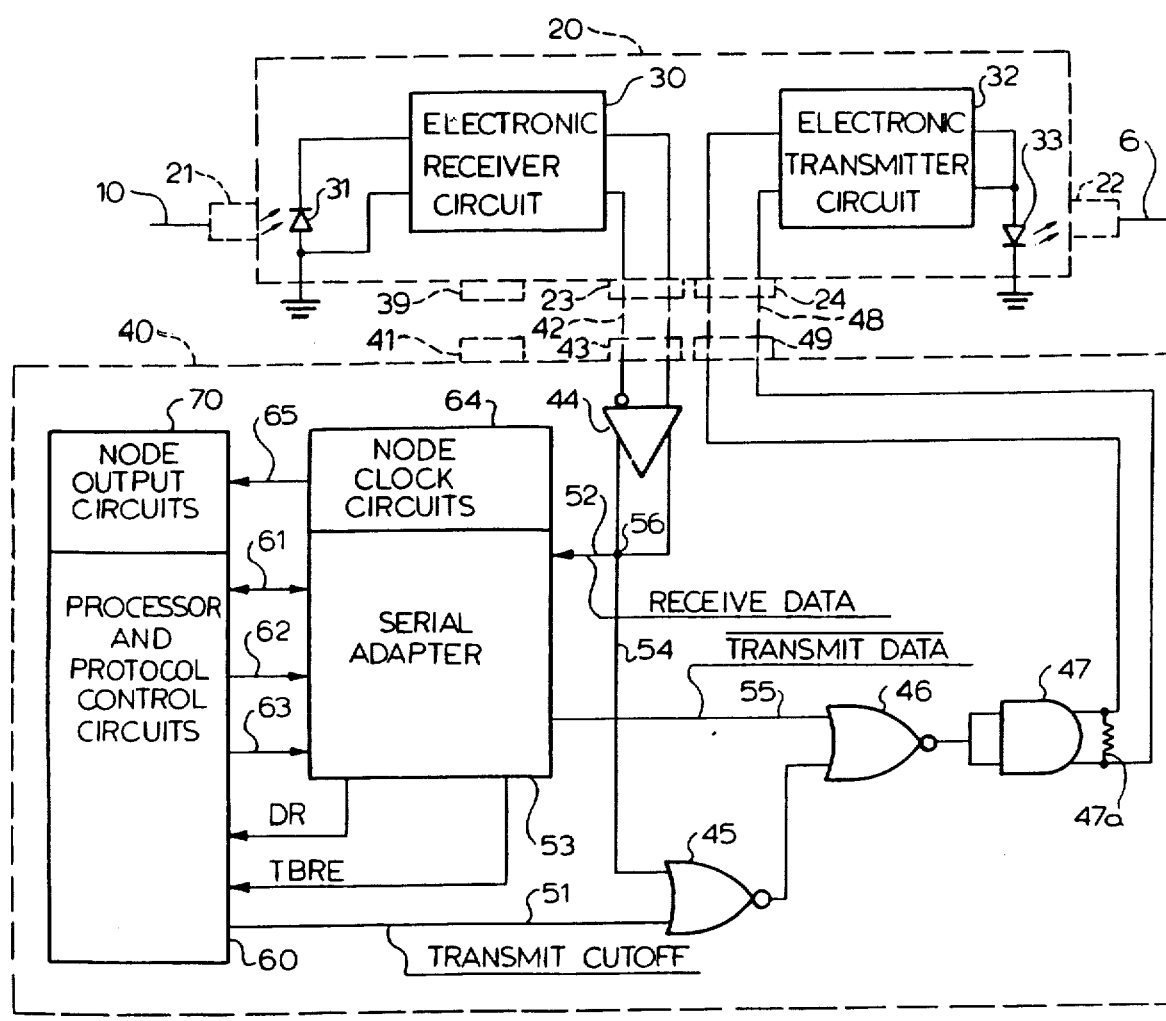
FIG. 2 is an electric circuit diagram illustrating a specific implementation of a transmission link switch for the nodes of a ring type computer network such as shown in FIG. 1 and indicating pulse amplification inserted in series with the transmission link switch, and node circuits for receiving and transmitting data and for controlling the transmission link switch.

For such a system it is advantageous to provide a standardized fiber optic interface module such as indicated at 20, FIG. 2, having a standard fitting 21 for receiving an incoming fiber optic transmission line and having a standard fitting 22 for connection with an outgoing fiber optic transmission line. Further standard electric cable fittings are indicated at 23 and 24 for providing an electric signal output and an electric signal input for the fiber optic interface module. The interface 20 may comprise an electronic receiver circuit 30 associated with an optical detector 31 and an electronic transmitter circuit 32 for driving an optical emitter 33.

The electronic receiver circuit 30 may be of a standardized design suitable for driving any of the various types of node circuitry such as indicated at 40. Further, the circuits 30 and 32 together may provide an optimum degree of amplification such that when cable fittings 23 and 24 are directly connected by means of a jumper cable, interface module 20 may serve as a simple repeater. In the event that module 20 does not include its own power supply, a further connector means may be provided as indicated at 39 which may be coupled to cooperating means 41 of node circuitry 40 so that power may be supplied to the interface module 20 from node circuitry 40. If node circuitry 40 is to be disconnected from module 20, e.g. because of a malfunction, a separate power supply module (not shown) may be connected at 39 to provide for operation of the interface module 20 independently of the node circuitry 40.

In general, a ring network such as shown in FIG. 1 may have fiber optic links such as 6 through 10 of a maximum length compatible with the amplification provided by components 30 and 32 of a standard interface module such as 20. Thus if node circuits 1 through 5, FIG. 1, comprise actual working computer circuits such as microprocessor units, electronic display units (e.g. cathode ray tube displays), keyboards, printers, and the like), the fiber optic links may each consist of a single continuous fiber optic strand without any amplification. A passive jumper cable between fittings 23 and 24 would then be used only to bypass the working node circuitry such as 40 in the event of a malfunction or the like.

A basic aspect of the system of FIG. 1 resides in the provision of a decentralized network where in principle any of the working node circuits 1 through 5 may be bypassed (e.g. at 23, 24, FIG. 2) without detriment to communication among the remaining nodes. Furthermore the transmission of data via an interface module is not subject to a processing (clock cycle) delay when the associated transmission link switch is in its first transmission mode (or is bypassed because of a malfunction). In particular, where electronic node circuitry, such as 40, FIG. 2, requires a given clock cycle time for executing a processing step, the signals being sent along the loop circuit such as shown in FIG. 1 traverse the node circuitry at an electronic transmission speed which is independent of the duration of such a clock cycle or processing interval and is dependent only on the actual response times of the circuits disposed in the transmission link switch path. Referring to FIG. 2, the switch path may include optical detector 31, receiver circuit 30, a cable 42 between fittings 23 and 43, pulse amplifier 44, NOR circuits 45, 46, pulse amplifier 47, a cable 48 between fittings 49 and 24, transmitter circuit 32 and optical emitter 33. In the particular exemplary embodiment of FIG. 2, which is based on commercially available components at the time of development, each of the transmission link switches such as 11 through 15 in FIG. 1 is implemented by means of a TTL (transistor transistor logic) integrated circuit module, and in particular by the NOR gate 45. An input line 51 of gate 45 is held at a logical zero potential to maintain switch 45 in its first pulse transmitting mode. To shift the switch 45 to its second nontransmitting mode, line 51 is shifted to a logical one "Transmit Cutoff" condition.

In FIG. 2, an electronic branching point 56 is provided at the output of electronic amplifier 44 so that incoming signal pulses can be supplied via a line 52 to a serial adapter component 53 as well as being supplied to the transmission link switch 45 via its second input 54.

When the node circuitry 40 has placed switch 45 in its second transmission cutoff mode, the serial adapter component 53 may effect a data transmission along the loop transmission path (FIG. 1) by supplying electronic pulses to an input line 55 of the NOR gate 46. Gate 46 thus provides a junction for coupling locally generated signal pulses onto the outgoing path leading from the transmission link switch (NOR gate 45) to the outgoing transmission link. Thus the incoming signal branching means which is indicated diagrammatically in FIG. 1 may be comprised of an electronic junction point as indicated at 56, FIG. 2. The "Receive Data" path 52 in FIG. 2 corresponds with the incoming signal branch path 17 indicated in FIG. 1. Similarly the "Transmit Data" line 55 in FIG. 2 corresponds to the outgoing signal sending path 18 indicated in FIG. 1.

For the particular node circuitry shown in FIG. 2, data is received as a time sequence of pulses on a single input channel 52. The pulses may represent successive hexadecimal characters and may be accumulated in a serial to parallel input register of component 53. For example, a given station of FIG. 1 may transmit a two character bid code followed by an address code representing the transmitting or bidding station or device. If the input register of component 53, FIG. 2, has received such a two character bid code, it can be transferred in parallel to a component 60 for processing, via a multiconductor data path indicated at 61. Such a transfer can be initiated by applying a momentary logical one signal to a read line 62. Similarly data from component 60 to be transmitted may be transferred in parallel via data path 61 to an output register of component 53 in response to a momentary logical one signal to a write line 63. Such data can then be output serially at a clock rate of an associated clock circuit 64 via transmit data line 55. Line 65 may connect a clock rate signal and the inverse of the clock rate signal with components 60 and 70. Component 70 may be a printer control circuit, for example. Data may be transmitted from component 60 to component 70 via a multiconductor path (not shown) and logical control signals may be supplied from component 60 to component 70 for effecting a desired output operation, with suitable acknowledgement and status signals being supplied from component 70 to component 60 in a conventional manner. Component 60 may be implemented, for example, as a type 8748 integrated circuit, commercial sources for this microcomputer with programmable read only memory being given in IC MASTER for 1981, page 555, lines 100 et seq.

Figure 3:
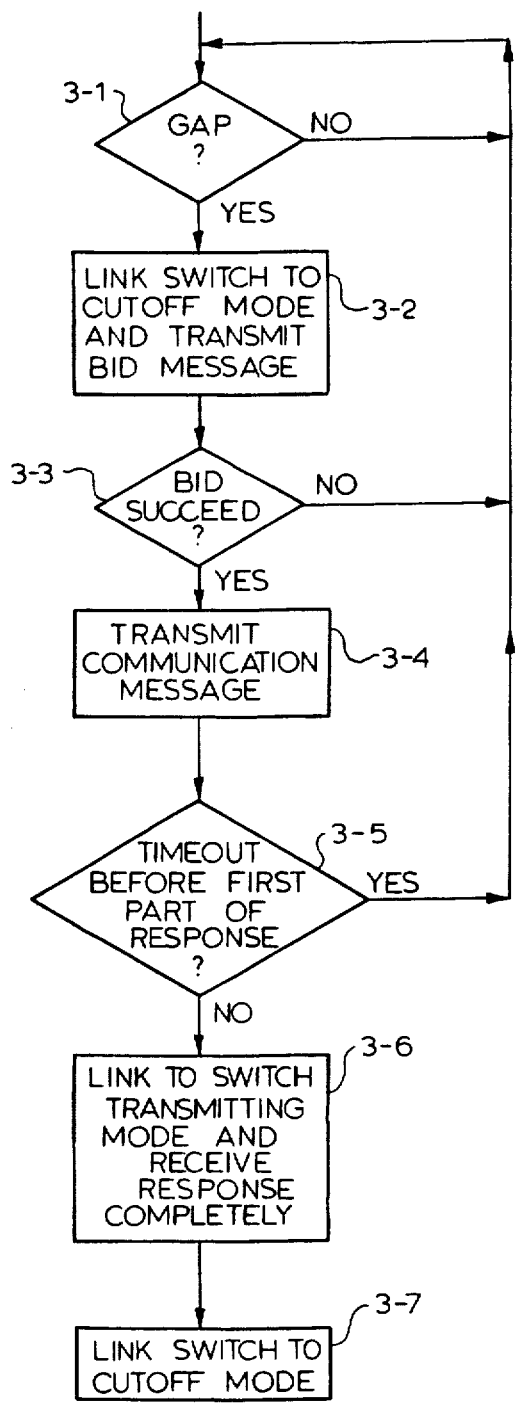
FIGS. 3 and 4 comprise flow diagrams for explaining the system and method in accordance with the present invention.
Figure 4:
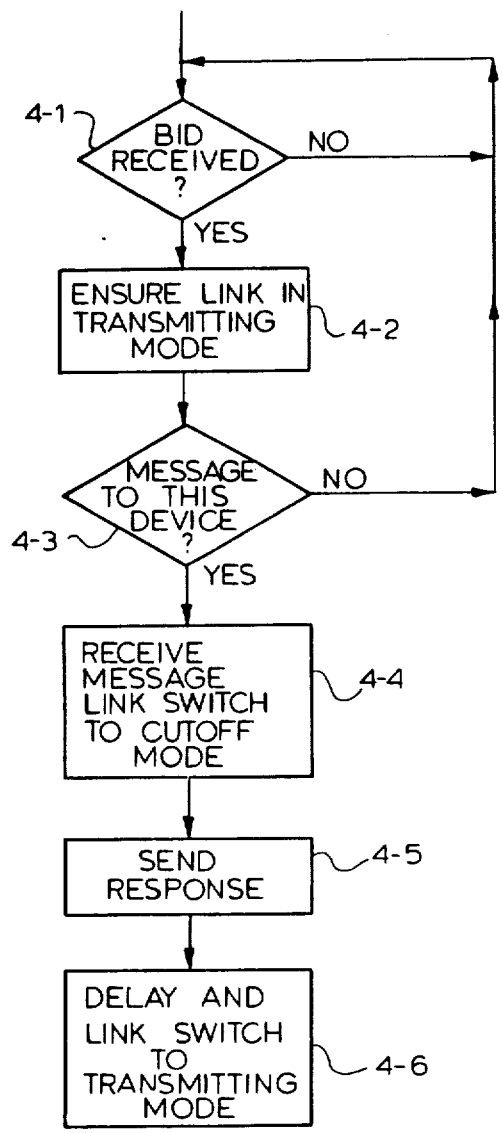

A further understanding of the system of FIGS. 1 and 2 and its operation may be had by reference to the flow diagrams of FIGS. 3 and 4. Reference numerals referring to these figures have an initial number corresponding to the figure number followed by a hyphen and a further digit or digits.

FIG. 3 is a simplified flow diagram for explaining operation at a node where a device is ready to transmit a data message. Such a node may have circuitry as shown in FIG. 2. FIG. 2 will be referred to in describing both sending and receiving nodes since it will be apparent when similar parts of two different nodes are intended. The sending node monitors its serial adapter 53 for the presence of data on the loop communication path. For example, component 60 may respond to each "Data Ready" signal supplied via line DR. In this case, the absence of a logical one signal at line DR for a predetermined time interval would indicate the existence of a communications gap. For example if the input register has eight stages, and if data is supplied to the input register at 125 kilobits per second, a data ready signal could occur after 64 microseconds. For the case of a printer station ready to transmit data, the microprocessor of component 60 can simply check for a Data Ready logical one condition on line DR at intervals of ten microseconds. The program can be such that if the Data Ready line DR remains at a logical zero condition during each of about ninety-eight monitor intervals, corresponding to a communications gap of about one millisecond, an affirmative decision is reached at the decision block 3-1. Decision block 3-1 can be implemented as a register which is initially set to a count value of ninety-eight and which is decremented each time the Data Ready line is found to be at the logical zero level and inspected for a zero count value representing the affirmative decision. If the Data Ready line DR is found to be at a logical one level, the register is reset to ninety-eight and a negative decision is reached as represented by the return path leading from the right hand corner of block 3-1.

Where the communications gap is detected, the microcomputer of component 60 proceeds as represented by step 3-2. In this event, a logical one is placed on the associated Transmit Cutoff line 51 to shift the transmission link switch 45 to its second transmission cutoff mode. At this point, having opened the direct loop path of FIG. 1, e.g. at transmission link switch 14, the microprocessor of component 60 checks for another communications gap of about one millisecond (e.g. a count of ninety) as an allowance for mistiming. If this second gap is also found to be present, then a bid message is loaded into an output register of the serial adapter 53 and transmitted to the Transmit Data line 55 at the transmission rate desired for the loop communication path of FIG. 1. The bid message may include a first two hexadecimal characters, e.g. 55 (hexadecimal), followed by two hexadecimal characters representing the address of the bidding (originating) station (e.g. a number between one hundred and twenty-eight and two hundred and fifty-five). Where data channel 61 and/or the output register of component 53 has a capacity less than that required for a given message length, it will be understood that suitable portions (e.g. successive eight bit bytes) of the complete message may be transferred via an output buffer register to the output register in successive operating cycles. Thus if eight bits at a time are loaded via path 61, a first eight bits may be transmitted in a burst with a duration of sixty-four microseconds after which a second eight bit portion of the message is loaded into the output register and sent. Alternatively, the component 60 may be operated at a higher clock rate, e.g. six megahertz, and may load a complete message into a sixteen bit output register, eight bits at a time, whereupon the complete sixteen bit message is sent over a desired transmission interval.

For a specific serial adapter 53 (e.g. a type IM 6402-1 Universal Asynchronous Receiver-Transmitter), each eight bit byte of data may be sent as part of a character group comprising: one start bit, eight data bits, one parity bit and one stop bit, a total of eleven bits. With the system and method herein disclosed, a message may be of any desired length. For example with an eight-bit HASH character representing the sum of bytes starting with a one-byte local address, and a one-byte status, the data part of the message could contain over 250 bytes.

Once the bid message has been transmitted, the bidding station monitors its serial adapter 53 to determine if its bid message has completely traversed the loop communication path. If this is the case, the bid message will be received at the input register of the serial adapter 53 of the bidding station (e.g. node 4) signifying a successful bid as represented by block 3-3, FIG. 3. For the case where two hexadecimal characters at a time are transferred via the data link 61 from an input buffer register associated with the input register of serial adapter 53, the program may provide that upon receipt of the characters 55 (hexadecimal), the program awaits arrival of the next two characters and compares the received address with the address of the bidding station. If the address is equal to that of the bidding station, the program proceeds to block 3-4 as represented in FIG. 3. It will be understood that block 3-4 is executed without allowing the occurrence of a communications gap (of about one millisecond) at any of the other nodes, and that the other nodes are so programmed that the node link transmission switches will all remain in the first transmitting mode in the absence of the necessary communications gap. It will be understood that each block of data as transmitted will be received at each of the other nodes and should also traverse the loop and arrive at the input register of the sending station.

A response to the message sent by the successful bidder (e.g. node 4) is required. If this is an initial transmission from the bidder, then the response can be data (e.g. to be printed). It can also be a Message Accepted signal (ACK), Message in Error, Retry (NAK), Message Accepted and Acted Upon (DEND), or Message Cannot Be Accepted by Addressed Device At This Time (BUSY). As indicated at block 3-5, the bidder waits for a response for a suitable time interval, e.g. about one millisecond. If the first part of a response is received before the interval elapses, then the transmission link switch at the bidding station (e.g. switch 14, FIG. 1) is placed in its first transmitting mode as represented by block 3-6. This prevents a communication gap from being observed at stations beyond the original bidding station, e.g. stations no. 5 and no. 1, if station no. 2 was being addressed and is responding. The original bidding station can now receive and process any remaining part of the response (e.g. from station no. 2).

The original bidding station must again shift its transmission link switch (e.g. 14) to the second transmission cutoff mode as represented by block 3-7.

FIG. 4 indicates in a simplified flow diagram the operation of a receiving station in responding to the transmission of a communications message (sent as outlined in FIG. 3). When a receiving station receives a bid message, the first part of the message is symbolized as CLOSEL (close link) and is the number 55 (hexadecimal). The second part of the message is the address of the bidding node. When a bid is recognized as represented by block 4-1, the first step at the receiving station is to ensure that the transmission link switch (e.g. switch 12 of node no. 2) is in the first transmitting mode as shown by step 4-2.

The message transmitted by the bidding station may have the following component parts: a Start Character, (STCHR, e.g. 5E, hexadecimal); an Address of the Device to Receive Data, (TOADDR): the bidding device address, (ADDR); a Command (COM) to the Device Receiving the Message or the Status (STATUS) of the Bidding Device Which is Responding to a Command: Optional Data Intended for the Receiving Device (DATA); a Longitudinal Redundancy Check (LRC); and a Byte Sum of All Bytes Starting with ADDR through DATA, (HASH).

The message may include the TOADDR part twice so that if there is a discrepancy between the two receiving values for TOADDR, the message is ignored.

The receiving nodes each compare the TOADDR value with the address assigned to its device. If the received message is addressed to its device, as determined at block 4-3, then the DATA, LRC and HASH parts are read as represented at block 4-4. If the DATA part conforms with the LRC and HASH parts, the DATA is considered to be acceptable. In any event the addressed device must respond in less than one millisecond. A response message may take the format given above, or it may include the following parts: Start Character, STCHR (5E hexadecimal), and a response character, RCHR, sent twice. The response character may be ACK (78 hexadecimal), NAK (19 hexadecimal), DEND (same code as CLOSEL), or BUSY (2C hexadecimal).

In general the station receiving a message will first place its transmission link switch (e.g. switch 12 for node no. 2) in the second cutoff mode. Then the one of the response messages is sent as represented at block 4-5. Having sent the response, the responding station executes a time delay so as to allow for transmission propagation about the loop (so that the response only can traverse the loop once), and having blocked a second traverse of the loop, the transmission link switch (e.g. switch 12 of node 2) is placed in its first transmitting mode.

Outline of Successful System Operation

In an actual system which has been successfully operated, provision is made for resolving conflicts where several nodes issue bid messages simultaneously. A more detailed outline of programming under these circumstances is as follows, with most of the steps of the outline being assigned sequential numbers for convenience of cross reference.

GAPREC—step one

This is an entry point at a one-millisecond gap for checking for input data. The sequence of steps following this entry point is entered after a communications gap is recognized pursuant to decision block 3-1 of FIG. 3.

SNDREQ?—step two

If the device has data to send (Send Request is set), then the bidding/sending routine is executed beginning at step eleven of this outline, and which corresponds to the sequence beginning at block 3-2 in FIG. 3.

FIRST CHAR.=CLOSEL?—step three

If the device is to receive data, the first character received must be the close link request character CLOSEL. See the discussion of block 4-1, FIG. 4, and compare step thirteen et seq. of this outline. A bidding station which is unsuccessful is branched to this step three from step fifteen of this outline.

If the first received character is not CLOSEL, then the program may return to a MAIN CODE routine not relevant to the present disclosure.

CLOSE LINK—step four

Make sure the link switch is in transmitting (closed) mode at this device. If the link switch was in cutoff (open) mode at this device, the bidding device will retry thus getting through.

READ NEXT CHAR—step five

START CHAR?—step six

Wait for bidding to finish, returning from step six to step five until a Start Character STCHR is received.

MESSAGE TO THIS DEVICE?—step seven

The "to" address in the message indicates whether the data is directed to the local device. The "to" address is sent twice and both address values must be the same before acceptance.

If the message is not to this device, the program may return to a MAIN CODE routine not relevant to the present disclosure.

RECEIVE DATA—step eight

See the discussion concerning block 4-4, FIG. 4.

DATA OK?—step nine, part A

OPEN LINK, NAK, DELAY (later inserted), CLOSE LINK—step nine, part B

In part A of step nine, the processor of component 60 may compute the LRC and HASH values for the received data, and compare the computed values with the received values for LRC and HASH. If the computed and received values do not match, then a NAK response is transmitted to indicate that the received data is defective. As explained hereafter in reference to step seventeen of this outline, a master device may count NAK responses to a message, and reset its Send Request register after a predetermined number of failures. For minor devices, attempts to send the data may continue indefinitely. Where the sending device is to retry sending the message, another communications gap will occur before the message may again be received. Thus if the received data is defective, the program branches from part A to part B of step nine, and then after execution of part B returns to a MAIN CODE routine not relevant to the present disclosure.

The DELAY procedure of part B of step nine was later inserted as explained in connection with step nineteen hereafter.

RESPOND—step ten

If the received data is good, an appropriate response is sent. See block 4-5, FIG. 4.

SEND (Bidding/Sending Routine)

As stated under step two above, if the device has data to send, then a branching takes place after step two to a bidding/sending routine. The entry point for this routine is designated "SEND". The steps of the SEND routine are designated eleven through 18, and are outlined as follows:

OPEN LINK—step eleven

Since the device needs to originate a message, it must cut off the direct loop path (otherwise oscillation will occur in the ring network because of the progressive amplification at the successive nodes during each traverse of the loop path).

GAPSND?—step twelve

In this step, the prospective sending station monitors the communication loop for another millisecond communication gap before transmission is allowed.

If data is received during the gap timing interval, the program branches to step three above.

SEND BID—step thirteen

In this step a bid for link control is made, the step thus corresponding to a portion of block 3-2, FIG. 3. The bid message comprises the close link request character (CLOSEL) and the sending device address (ADDR). The close link request character requests the previous link controller (e.g. the previous successful bidder prior to the communications gap) to shift its link switch to the transmitting (closed) condition. The address which forms part of the bid message enables the resolution of simultaneous bids by allowing the bidding device with the lowest address to rebid, while forcing devices with higher addresses to drop out of the bidding.

CLOSEL CHAR RECEIVED?—step fourteen

If the bidding device awaits for a predetermined time interval without receiving a communication, or if a close link request character is not received, the program branches to the MAIN CODE routine, and the bid is retried after detection of a further communications gap.

ADDR: DEVICE'S ADDR?—step fifteen, part A

WAIT 100 MICROSECONDS—step fifteen, part B

If a bid message has been received, the address part ADDR as received is compared with the local device address. If the address values are the same, there is no bidding conflict and the local device proceeds to send its data See block 3-4, FIG. 3, and steps twenty-four et seq of this Outline.

If the received address part is lower than the local address, the local device has lost the bidding. Thus the program branches to step three above If the received address is higher than the address of the local device, the local device executes part B of step fifteen so as to allow time for losing bidders to follow steps three and four above. This prevents an unsuccessful bidding station from cutting off a first portion of a new bid message.

If the local device has the lower address, it rebids after part B of step fifteen, by returning to step thirteen above. In this way, contention can continue until all link switches except that of the bidder with the lowest address have been placed in transmitting (closed) condition. With a situation such as shown in FIG. 1 with only one link switch cutoff, a bid message from the associated device, e.g. at node 4, will be transmitted about the loop (via link switches 15, 11, 12, and 13) and be received at the bidding device. Thus the address in the received bid message will correspond to the local address. See block 3-3, FIG. 3.

SEND DATA—step sixteen

Send data and await a response. The details of this SEND DATA routine begin at step twenty-four of this outline.

SEND FAIL?—part A of step seventeen
>255 RETRIES?—part B of step seventeen

If the data transmission has failed (see part B of step twenty-seven), the program branches from part A to part B of step seventeen. The number of retries is incremented after each failure, and if the number of retries is not greater than 255, the program returns to the MAIN CODE routine without resetting the Send Request register (SNDREQ). It is then necessary to wait for a communications gap before executing a retry. If transmission has failed more than 255 times, the Send Request is reset before returning to MAIN CODE. See step eighteen which follows part B in this case.

RESET SNDREQ—step eighteen

If transmission is successful as determined in part A of step seventeen then the resetting of SNDREQ signals completion of data transmission, and the program returns to the MAIN CODE routine.

RESPOND

When a receiving station determines that received data is good (e.g. as a result of part A of step nine above), then a response is to be sent as represented at block 4-5, FIG. 4. This routine is outlined in the following which includes steps nineteen through twenty-three.

IMMEDIATE EXEC?—part A of step nineteen
OPEN LINE, ACK, DELAY (later inserted), CLOSE LINK—part B of step nineteen When data has been received, the receiving station may determine that an acknowledgement (ACK) is all the response that is required; in this case, the program branches from part A to part B of step nineteen. Also where no response can be made, the local device will send the ACK message as indicated by part B. On the other hand, if the response can be made immediately, the program progresses to step twenty The DELAY procedure of part B of step nineteen, and the corresponding delays in part B of step nine and in part B of step twenty were later inserted, and may have a duration of 200 microseconds. These inserted time delays insure that the sending station will have received the respective response and shifted its link switch to cutoff mode. See step 3-6, FIG. 3, and the "OPEN LINK" step following step twenty-eight in this Outline.

DATA TO SEND—part A of step twenty
OPEN LINK, DEND, DELAY (later inserted), CLOSE LINK—part B of step twenty In part A of this step, the processor determines whether the response requires the transmission of data. If not, the program branches to part B of step twenty and transmits an indication of command acceptance (DEND). The DEND transmission indicates an end of communication.

SEND DATA—step twenty-one

This routine begins at step twenty-four of this outline and corresponds to block 4-5, FIG. 4.

DELAY, CLOSE LINK—(later developed steps)

These steps follow step twenty-one and correspond to block 4-6, FIG. 4. A delay of 200 microseconds provides time for data to be transmitted through the buffers of the serial adapter such as 53 of the responding station, and time for the bidding station to shift its link switch to cutoff mode. The time delay also accommodates any time lags in the repeater circuitry intervening between the responding device and the bidding device. Thus, before the responding station has shifted its link switch (e.g. switch 12 at node 2) to its transmitting (closed) mode, the bidding station will have received the complete data message transmitted by the responding station (block 3-6, FIG. 3), and will have again shifted its link switch to cutoff (open) mode (block 3-7, FIG. 3). The objective is to maintain one of the link switches such as 11 through 15, FIG. 1, in cutoff mode at all times (while avoiding a communications gap at stations beyond the bidding station during the transmission of response data). Such concept of maintaining one link switch in cutoff mode at all times was considered crucial to successful operation of the actual system of the present Outline, this system being designated the A Line System. (The lack of a step number for these steps of the Outline indicates their later insertion to effect successful operation. Delays were also later inserted before shifting the link switch of the responding station to transmitting mode at part B of steps nine, nineteen and twenty.)

SEND FAIL?—step twenty-two

If the failure indication of part B of step twenty-seven has not been actuated, the response has been successfully transmitted, and the processor returns to the MAIN CODE. If the response failed to get through, processing progresses to step twenty-three which follows.

SET SNDREQ—step twenty-three

By setting the Send Request, SNDREQ, the processor is set up to retry sending the response upon detection of a communications gap of one millisecond.

After setting up to retry sending the response when a new communications gap is found, the program returns to the MAIN CODE routine.

SEND DATA

This routine is entered at steps sixteen and twenty-one of this outline, and is summarized in the following which includes steps twenty-four through twenty-eight.

OPEN LINK, SEND START CHAR, TOADDR, TOADDR, and DEVICE ADDR—step twenty-four

When a bidding station determines that the loop is complete at step fifteen, part A, the bidding station should have its link switch (e.g. 14, for node 4) in the cutoff (open) mode. To insure this, however, an Open Link command is transmitted by the processor of component 60 for making certain that line 51, FIG. 2, is at the logical one transmit cutoff potential. Transmission of the Start Character, STCHR, terminates bidding. The further parts of the message have been discussed in relation to block 3-4, FIG. 3. The address of the intended recipient, TOADDR, is sent twice as previously mentioned. Then the local device address, ADDR, is sent.

SEND REST OF DATA—step twenty-five

The bidding station, having won the bid, may send a command (COM) to the device addressed or may send the status (STATUS) of the local device in responding to a command from the device addressed.

SEND LRC, HASH—step twenty-six

LRC is defined as a longitudinal redundancy check, namely the exclusive OR bytewise of all bytes starting with ADDR, and including any command, COM, or STATUS response, and any optional data (DATA) for the receiving device.

HASH is defined as the byte sum of all bytes starting with ADDR through DATA.

This step has been modified to omit a final CLOSE LINK command, so as to insure that a responding station will have shifted its link switch to cutoff mode before the bidding station shifts its link switch (e.g. 14, FIG. 1) to the transmitting (closed) mode.

RESPONSE?—part A of step twenty-seven

INDICATE FAILURE—part B of step twenty-seven

A response to the message of steps twenty-four, twenty-five and twenty-six is required, at least an acknowledgement,(ACK), or a Message in Error, Retry (NAK). If the message was an original transmission from the bidder, then the response can be a transmission of data. It can also be ACK, NAK, Device End (DEND), or BUSY. See the previous discussion in relation to block 3-5, FIG. 3, and in relation to block 4-4, FIG. 4. The DEND response indicates that the communication has been accepted and the command performed. No status report (STATUS) can be returned by the responding device. The BUSY response indicates that the responding device cannot handle the request at this time. A master station will automatically retry 255 times when a BUSY response is received. Minor devices will discontinue trying to send the message.

If there is no response within one millisecond, then communication failure is indicated, and the program proceeds from part A to part B of step twenty-seven. Having registered the failure, the processor proceeds to the OPEN LINK step following step twenty-eight.

CLOSE LINK (later inserted step)

Before the link switch of the sending station is placed in the transmitting (closed) mode, the sending station is to ensure that a receiving station has received the transmitted data and placed its link switch in cutoff (open) mode to transmit the response. Thus the sending station waits for the response as shown by step twenty-seven, part A, and only shifts the link switch to transmitting mode if a response is actually received.

If no response is received in part A of step twenty-seven within one millisecond, the link switch is not closed, the program branching from part B of step twenty-seven to the step following step twenty-eight of this outline.

NAK?—step twenty-eight

After closing the link switch, if the sending station determines that the response received was a NAK (message in Error,Retry), then the program returns to part B of step twenty-seven to indicate a communication failure, and then goes on to the OPEN LINK step which follows herebelow.

OPEN LINK (later inserted step)

If a response is received which is not a NAK, then when the complete response has been received, the sending station promptly shifts its link switch to the cutoff (open) mode before the responding station shifts its link switch to the transmitting (closed) mode (following a time delay). See block 3-7, FIG. 3.

If a failure in the transmission occurred resulting in a NAK, the link switch of the sending station will have been shifted to transmitting (closed) mode; accordingly the program branches from part B of step twenty-seven to the present "OPEN LINK" step.

Thus in any event at the end of the SEND DATA routine, the link switch of the sending station will be in the cutoff (open) mode.

If a responding station has data to send (part A of step twenty), it follows the routine of steps twenty-four et seq above, but then shifts its link switch to transmitting (closed) mode after a time delay of 200 microseconds, so that the sending station (the bidder) has time to shift its link to cutoff (open) mode after receiving the complete message.

In the system which has been successfully operated, exemplary components had the following implementation:

Fiber Optic Interface

Optical detector OD1 (31, FIG. 2)—type SD 4478.

Electronic Receiver (30, FIG. 2)—cascade connection six line receivers A1-1, A1-2, A1-3, A2-1, A2-2, and A2-3-type MC 10116. Input circuit of A1-1: pin 10 of A1-1 connected to upper terminal of grounded C12 (680 pF, 100 V) and to upper terminal of R11 (20 kilohms, 1%); pin 9 connected to upper terminal of R10 (20 kilohms, 1%) and to cathode of OD1; opposite terminals of C12 and OD1 to ground; opposite terminals of R10 and R11 to pin 11 of A1-1 and to upper terminal of grounded C8 (0.1 microfarad, 100 V), lower terminal of C8 to ground. Pin 7 of A1-1 to pin 5 of A1-2 and to grounded resistor R12 (200 ohms, 1%); pin 6 of A1-1 to pin 4 of A1-2 and to grounded resistor R13 (226 ohms, 1%); pin 3 of A1-2 to grounded resistor R14 (200 ohms, 1%) and to left terminal of C10 (0.001 microfarad, 100 V); right terminal of C10 to upper terminal of R16 (1 kilohm, 1%) and to pin 13 of A1-3; pin 2 of A1-2 to grounded R15 (200 ohm, 1%); pin 12 of A1-3 via one kilohm resistor (1%) to lower terminal of R16 and to pin 11 of A1-1; pin 15 of A1-3 to grounded R18 (301 ohm, 1%) and to left end of R20 (1K, 1%); right end of R20 to pin 10 of A2-1 and via R7 (10 kilohm, 1%) to pin 7 of A2-1; pin 14 of A1-3 to grounded R19 (301 ohms, 1%); pin 7 of A2-1 to R7, to grounded R6 (1 kilohm, 1%) and to pin 5 of A2-2; pin 9 of A2-1 to pin 6 of A2-1 via R8 (1 kilohm, 1%) and to pin 11 of A2-2 via R9 (1 kilohm, 1%); pin 6 of A2-1 to R8, to grounded R5 (1 kilohm, 1%) and to pin 4 of A2-2; pin 11 of A2-2 to R9 and to grounded C9 (0.1 microfarad, 100 V); pin 3 of A2-2 to grounded R4 (1 kilohm, 1%), and to pin 13 of A2-3; pin 2 of A2-2 to grounded R3 (1 kilohm, 1%) and to pin 12 of A2-3. Output circuit of A2-3: pin 15 to grounded R2 (1 kilohm, 1%) and to pin 3 of connector J2 (RRCV HI); pin 14 of A2-3 to grounded R1 (1 kilohm, 1%) and to pin 4 of connector J2 (RRCV LO).

Connector (23, FIG. 2): J2 pin 2—ground, J2 pin 3—RRCV HI, J2 pin 4—RRCV LO, J2 pin 5—ground.

Connector (39, FIG. 2): J1 pin 1 - plus five volts (+5 VT, transmit), J1 pin 2—ground, J1 pin 5—ground, J1 pin 6—plus five volts (+5 VR, receive).

Power supply circuit: J1 pin 6 to plus terminals of grounded C5 (220 microfarads, 6.3 V) and grounded C6 (0.47 microfarad, 50 V) and to left terminal of L1 (56 microhenry; ground terminal (GND) to J1 pins 2 and 5, and to J2 pins 2 and 5; right terminal of L1 to grounded C7 (100 microfarads, 6.3 V), grounded C1 (0.1 microfarad, 100 V) and grounded C2 (0.1 microfarad, 100) and to +5 V output (C1 and C2 are decoupling capacitors for the integrated circuits packs A1 and A2).

Electronic Transmitter Circuit (32, FIG. 2): J1 pin 1 (+5 VT) to plus terminal of grounded C11 (220 microfarads, 6.3 V), and to pins 8 (VCC) and 5 (BCV EN) of A3 (Type 75117), and to upper terminals of R21 (68 ohms, 1 watt, 5%), and to plus terminals of C3 (0.1 microfarad, 100 V) and of C4 (0.1 microfarad, 100 V)

and to +5 V output (C3 and C4 are decoupling capacitors for integrated circuit packs); A3 (type 75117) and A4 (type 75452); ground terminal (GND) to J1 pins 2 and 5, and to J2 pins 2 and 5, and to pin 1 (IN), pin 4 (GND) and pin 7 (D ENABLE) of A3; input (RXMIT HI) to J1 pin 3 and to pin 3 (A) of A3; input (RXMIT LO) to J1 pin 4 and to pin 2 (B) of A3; pin 6 (OUT) of A3 to pins 1, 2, 6 and 7 of A4 (type 75); pins 3 and 5 of A4 to lower terminal of R21 and to anode of optical emitter OE1 type SE 4352 (33, FIG. 2).

Optical emitter OE1 (33, FIG. 2 )—type SE 4352—anode of OE1 to pins 3 and 5 of A4 and to R21; cathode of OE1 to ground.

Twenty-Six column Printer Control

Connector (43, FIG. 2): J3 pin 3 (RRCV HI) to pin 5 of A42, type 75118 (44, FIG. 2); J3 pin 4 (RRCV LO) to pin 7 of A42 (44, FIG. 2).

Pulse amplifier (44, FIG. 2)—A421 (type 75118): pin 5 to J3 pin 3; pin 7 to J3 pin 4; pin 8 to ground; pins 10 and 13 via R4 (10 kilohms) to +5 V; pins 11 and 12 (RECEIVE DATA) to pin 8 of A221-type 6502 (NOR gate 45, FIG. 2) and to pin 20 of A13 - IM 6402-1 (Serial Adapter 53, FIG. 2); pin 16 to +5 V.

NOR gate A221-LS02 (45, FIG. 2): pin 8 to pins 11 and 12 of A 421 and to pin 20 of A13; pin 9 (TRANSMIT CUTOFF) to pin 38-P27 of A41-8748 EPROM (component 60, FIG. 2); pin 10 to pin 5 of A222-LS02 (46, FIG. 2).

NOR gate A222-6502 (46, FIG. 2): pin 5 to pin 10 of A221; pin 6 to pin 6 of A12-LS04 (Inverter 57, FIG. 2); pin 4 to pins 14 and 15 of A422 (pulse amplifier 47, FIG. 2).

Pulse amplifier A422-75118 (47, FIG. 2): pins 1 and 2 to lower terminal of R2-120 ohm (47a, FIG. 2) and to J4 pin 3 (RXMIT LO); pins 3 and 4 to upper terminal of R2 and to J4 pin 4 (RXMIT HI).

Connector (49, FIG. 2): J4 pin (RXMIT LO) to J1 pin 3; J4 pin 4 (RXMIT HI) to J1 pin 4.

Serial Adapter—A13, IM 6402-1, IOC, UARTaSocket (component 53, FIG. 2): pin 1 (VCC) to +5 V; pin 3 (GND) to ground; pin 5 (RBR8) and pin 33 (TBR8) to pin 19 (DB7) of A41, etc. to provide eight conductors of the multiconductor path (61, FIG. 2); pin 23 (TBR1) to pin 10 ($\overline{WR}$) of A41 via write line (63, FIG. 2); pin 4 (RRD) and pin 18 (DRR) to pin 8 (RD) of A41; pin 40 -2 MHZ (TRC) and pin 17 - 2 MHZ (RRC) to 2 MHZ output of node clock circuits (64, FIG. 2); pin 21 (MR) to RESET; pin 19 (DR) to pin 1 of A41 via data ready line (DR, FIG. 2); pin 22 (TBRE) to pin 39 of A41; pin 20 (RBI) to RECEIVE DATA line (52, FIG. 2); pin 25 (TRO) to pin 5 of A12-LS04; pin 39 (P5), pin 35 (PI), pin 36 (SBS), and pin 16 (SFO) to ground; pin 38 (WLS1), pin 37 (WLS2) and pin 34 (CRC) to +5 V.

Inverter A12-LS04: pin 5 to pin 25 of A13 (53, FIG. 2); pin 6 to pin 6 of A222-LS02 (46, FIG. 2).

Processor and Protocol Control Circuits - A41-type 8748 EPROM (60, FIG. 2): pin 4 ($\overline{RESET}$) to line $\overline{RST}$; pin 2 (XTAL 1) to 6 MHZ output of the node clock circuits (64, FIG. 2); pin 3 (XTAL 2) to 6 MHZ of the node clock circuits (64, FIG. 2); pin 33 (P16) to line $\overline{TST}$; pin 7 (EA) and pin 20 (VBS) to ground; pin 6 ($\overline{INT}$) to J1 pin 39 (COVER OPEN); pin 32 (P15) to J1 pin 38 (LOW PAPER); pin 26 (VDD) and pin 40 (VCC) to +5 V; pin 39 (T1) to Transmit Buffer Empty line (TBRE, FIG. 2); pin 1 (T$\phi$) to Data Ready line (DR, FIG. 2); pin 38 (P27) to Transmit Cutoff line (51, FIG. 2); pin 37 (P26), pin 36 (P25), pin 35 (P24) to three high order bits of a node address selector switch (weights 64, 32 and 16); pin 24 (P23), pin 23 (P22), pin 22 (P21) and pin 21 (P20) to four low order bits of the node address selector switch (weights 8, 4, 2 and 1); pins 19, 18, 17, 16, 15, 14, 13 and 12 (DB7, DB6, DB5, DB4, DB3, DB2, DB1, DB$\phi$) to eight lines of data path to A13 (data path 61, FIG. 2); pin 10 ($\overline{WR}$) to UART WR line (63, FIG. 2); pin 8 (RD) to UART RD line (62, FIG. 2); pin 29 (P10) to output circuits (70, FIG. 2) via ACT line; pin 28 (P11), via RTS line; pin 29 (P12), via TD line: pin 30 (P13), to DTR line; pin 31 (P14) to $\overline{BTS}$ line; lines RTS, TD, DTR and $\overline{BTS}$ also leading to the output circuits (70, FIG. 2).

In the foregoing, the abbreviation "pf" refers to picofarads, the abbreviation "V" refers to volts, and the abbreviation "K" stands for kilohm.

Exemplary Loop Installation

In an exemplary layout according to FIG. 1, a first fiber optic interface FOIA has its output (like 22, FIG. 2) connected via a first fiber optic line L1 to a second fiber optic interface FOIB. The second fiber optic interface FOIB was connected via a second fiber optic line L2 to a third fiber optic interface FOIC which in turn was connected to the first fiber optic interface FOIA via a third fiber optic line L3.

A printer control (such as 40, FIG. 2) had its electrical input port (such as 43) connected to the electrical output port (such as 23, FIG. 2), but had its electrical output port (such as 49, FIG. 2) connected to the electrical input port of a keyboard display control. The electrical output port of the keyboard display control in turn was connected to the electrical input port (such as 24) of the first fiber optic interface FOIA.

Similarly, the second fiber optic interface FOIB has an electric path between its electrical output and input ports (like 23, 24, FIG. 2) including two master computers, and the third fiber optic interface FOIC couples into the overall loop a printer control and a cathode ray tube display. Thus there are two local stations which are locally interconnected by inexpensive electrical cables associated with each fiber optic interface. Either of the local stations can be bypassed by rearranging the local electrical cables. The local stations are linked by fiber optic lines so as to assure freedom from electrical and magnetic interference over the extended paths between local sites. In a restaurant environment the printer and the keyboard and display may be located at a cashier's station while the remaining components may be in management offices or the like.

Pursuant to 37 CFR 1.96 (a)(2)(ii), a computer printout (in continuous web form) is found in an accompanying protective cover and is designated "COMPUTER PRINTOUT APPENDIX PURSUANT TO 37 CFR 1.96(a)(2)(ii)". For the sake of identification of this material, a copy thereof is being included on the following twenty-five pages of the application as filed.

The parts of the accompanying computer printout have the following titles:

(I) ALINE MASTER I/O INTERFACE V2.6
(II) ALINE CONSOLE CONTROLLER V2.1
(III) ALINE PRINTER CONTROLLER V2.0
(IV) ALINE CRT CONTROLLER V1.1.

```
           TITLE    'ALIVE MASTER I/O INTERFACE   V2.6
           LIST     Z
           NLIST    R
*          ALINE Z80 MAJOR USED WITH LINKLESS PROTOCOL.
*          AUTHOR           JOE KOHLER
*          WRITTEN          SEPT. 19,1979
*          MAY 29,1980      FIX INTERRUPTS
*
*          V2.0
*          V2.1    6/06/80.  ADD POWER UP RESET COMMAND AND BUSY RETRY LIM
*          V2.2    9/08/80   ADD WARM RESTART CAPABILITY
*          V2.3    11/13/80  ADD SVC2,CHANGE COLD AND WARM RESTART,
*                            ADD NATIVE CODE IPL
*          V2.4    12/01/80  ADD RAM ADDRESSABILITY TEST. THIS TEST
*                            WILL ALSO DO A RUDIMENTERY RAM TEST.
*          V2.5    3/20/81   CHANGE MEMORY ERROR CODE TO ALLOW EASY
*                            TEST OF BOARDS. ALSO CHANGE MEMORY TEST
*                            TO 'STATIC' TYPE TEST
*          V2.6    4/23/81   ADD TO POWER UP MESSAGE FOR DEBUGGER
*
*          DEFINES
*                   LINKAGES TO INTERPRETER AND DEBUGGER
ZINT      EQU       1003H
ZBUGINT   EQU       1000H
TESTIND   EQU       3003H     INDICATOR TO MEMMORY ERROR CODE THAT TEST ROMS LOADED
TESTAD    EQU       3005H     ADDRESS OF TEST CODE
*
INDIC     EQU       55H       INDICATOR VALUE FOR RESTARTS ETC
FCLDT     EQU       2000H     ADDRESS OF DATA PATTERN TO CONFIRM NUL ROM
FCLDV     EQU       2002H     VECTOR OF FIRMWARE NULL CODE TO EXECUTE
FWRMT     EQU       2004H     ADDRESS OF POSSIBLE NUL WARM START CODE
FWRMV     EQU       2006H     VECTOR OF FIRMWARE NULL TO EXECUTE FOR WARM START
MERADR    EQU       81F8H     MEMORY ERROR ADDRESS SAVE LOCATION
MERV      EQU       MERADR+2  VECTOR OF NUL CODE FOR MEMORY ERROR HANDLER
SWRMT     EQU       MERV+2    ADDRESS OF DATA PATTERN TO CONFIRM RAM WARM START
SWRMV     EQU       SWRMT+2   VECTOR OF NUL CODE TO EXEC FOR RAM WARM START
*
OVRADR    EQU       7EH       ADDRESS INDICATING SENDING DEVICE POWERED UP
*
LNKCTL    EQU       0         LINK CONTROL
LINKST    EQU       0         LINK STATUS
LINK      EQU       1         LINK UART PORT
RESGAP    EQU       2         RESET GAP AFTER INTERRUPT
ALNADR    EQU       2         ALINE ADDRESS OF THIS DEVICE
NMISTA    EQU       0         NON-MASKABLE INT STATUS BYTE TO INDICATE WARMRESTART
MEMERC    EQU       3         TURN ON MEMORY ERROR LIGHT
MEALO     EQU       4         ADDRESS OF MEM ERROR LOW BYTE
MEAHI     EQU       5         MEMORY ERROR ADDRESS HIGH BYTE
WARMST    EQU       5         INDICATOR IN NMISTA OF WARM START VS MEMORY ERROR
WARMDB    EQU       1000      DEBOUNCE TIME FOR WARM RETART BUTTON
LNKIRD    EQU       8         LINK INPUT READY STATUS MASK
LNKORD    EQU       10H       LINK OUTPUT READY STATUS MASK
TIMDLY    EQU       24        TIMEOUT 0 VALUE .4 MSEC
CHRDLY    EQU       7         TIMEOUT FOR 1 CHAR ON LINK .15 MSEC
MAXNAK    EQU       255       MAXIMUM NAKS ALLOWED FOR A MESSAGE
ACKCHR    EQU       78H       VALUE OF ACK CHAR IN PROTOCOL
NAKCHR    EQU       19H       "        " NAK ""
ENDCHR    EQU       55H       ""         END       ""
BSYCHR    EQU       2CH       ""         BUSY      ""
CLOSEL    EQU       55H       CLOSE LINK REQUEST CHAR
STCHR     EQU       5EH       START CHAR OF PROTOCOL
*         DEVICE SERVICE BLOCK DEFINES (DSB)
DSBSTA    EQU       0         DSB STATUS

DEVICE    EQU       1         DSB DEVICE
DSBCOM    EQU       2         DSB COMMAND
DEVSTA    EQU       3         DSB DEVICE STATUS OR COMMAND
OBDPTR    EQU       4         DSB OUTPUT BUFFER DESCRIPTOR POINTER
INBUFA    EQU       6         DSB INPUT BUFFER POINTER
INBUFL    EQU       8         DSB INPUT BUFFER LENGTH
```

```
INRECL  EQU     10      ;DSB INPUT RECORD LENGTH RECEIVED
INTADR  EQU     12      ;DSB INTERRUPT ADDRESS POINTER
DSBLNK  EQU     14      ;DSB LINKED LIST POINTER
DSBNAK  EQU     3       ;NAKS FOR RECEIVING IN DSB
*       BIT NAMES FOR BITS IN DSBSTA
DOEND   EQU     7       ;DEVICE END IN RDRES
DDONE   EQU     7       ;DSB COMMAND COMPLETED OR FAILED
DPT     EQU     6       ;DSB COMMAND SENT, AWAITING COMPLETION
DBUSY   EQU     5       ;BUSY RESPONSE FROM DEVICE
DBADD   EQU     4       ;CHECK CHARS FAILED IN LAST INPUT MESSAGE
DITM    EQU     3       ;TIMEOUT1 OCCURED AFTER LAST TRANSMISSION
DNAK    EQU     2       ;NAK RECEIVED AFTER LAST MESSAGE
DPUP    EQU     1       ;DEVICE POWERED UP AFTER COMMAND
DACK    EQU     0       ;ACK RECEIVED AFTER LAST MESSAGE
*       BIT NAMES FOR BITS IN IOCTL (SEE MEMORY ALLOCATION)
TIMCHK  EQU     7       ;AT GAP INT. INDICATES TIMEOUT1
GAPCK   EQU     6       ;AT GAP INT. INDICATES A GAP IN PROTOCOL
UNKREC  EQU     5       ;INDICATES INPUT ON UNKNOWN DSB (DSBX LIST)
RECSET  EQU     4       ;AT FIRST CHAR INDICATES A PROTOCOL GAP HAS PASSED
BRKLNK  EQU     3       ;USED TO BREAK LINK
PEDLNK  EQU     2       ;SUB LINK
ERRLCK  EQU     1       ;MEMORY ERROR INTERRUPT LOCKOUT
FCHREN  EQU     0       ;ENABLE UART INT. INDICATING FIRST CHAR INT
*       MEMORY  ALLOCATION
        ORG     80004
DEVTAB  DS      256     ACTIVE DEVICE LIST
DSBX    DS      2       DSB POINTER FOR UNDEFINED INPUTS
IOCTL   DS      1       CONTROL OF GAP INT. AND LINK
SNDDSB  DS      2       ADDRESS OF NEXT DSB TO SEND OR CURRENT DSB THAT
                        ; RESPONSE IS DUE ON BY TIMEOUT1
*       NAKS,NXTDSB AND LSTDSB MUST BE IN THIS ORDER
NAKS    DS      1       ; USED TO KEEP TRACK OF NUMBER OF NAKS IN MESSAGE
NXTDSB  DS      2       ; POINTER TO NEXT DSB TO TRANSMIT
LSTDSB  DS      2       ; TAIL POINTER TO CURRENT LAST DSB TO TRANSMIT
NBLK    DS      1       ; NUMBER OF BLOCKS ON DISK (256 MAX = 65K PROG)
TEMP    DS      5       ; TEMPORARY USED IN VARIOUS PLACES
INTLSW  DS      1       ; NUL INTERRUPT STATUS BYTE
                        ; BIT 0 IS INTERRUPT PENDING
                        ; BIT 1 IS INTERRUPT ENABLE
INTHEAD DS      2       ; HEAD POINTER FOR DSB INTERRUPT LIST
INTAIL  DS      2       ; TAIL POINTER FOR DSB INTERRUPT LIST
ERRINT  DS      1       INDICATOR FOR INTERRUPT THAT MEM ERR OCCURED
DATAPC  DEFL    $
STACK   EQU     MERADR
*
*
*       PROGRAM         CODE
*
CODEPC  DEFL    0
        ORG     CODEPC
        JP      START
        JP      SVC0TU          USED FOR EXTERNAL ROUTINES TO CALL SVC0
        DW      IOMESS
        ORG     8
        EX      AF,AF'          GAP
        OUT     (RESGAP),A      CLEAR GAP INT
        JP      GAPINT

ORG     8*2             BOTH GAP AND FIRST CHAR. TREAT AS GAP INT
        JP      184
        JP      SVC2TO                  ;ENTRY FOR SVC2
        ORG     8*3             GAP AGAIN
        EX      AF,AF'
        OUT     (RESGAP),A
        JP      GAPINT
        ORG     8*4             DATA READY
        EX      AF,AF'          SAVE REGS
        IN      A,(LINK)        CLEAR FIRST CHAR (CAN ALWAYS IGNORE THIS CHAR)
        EXX                     SAVE REST OF REGS
        JP      FCHR
```

```
            ORG     8*5              DIAGNOSTIC BOARD INTERRUPT
            JP      ZBUGINT
            ORG     8*6              DATA READY AGAIN
            EX      AF,AF'           SAVE REGS
            IN      A,(LINK)         CLEAR FIRST CHAR (CAN ALWAYS IGNORE THIS CHAR)
            EXX                      SAVE REST OF REGS
            JP      FCHR
            ORG     8*7
            EI
            RET
*           MEMORY ERROR NONMASKABLE INT.
            ORG     66H              MEMORY ERROR INTERRUPT
            PUSH    AF
            PUSH    HL
            LD      H,0
NMI0        IN      A,(NMISTA)       IS IT MEM ERROR OR RESTART
            BIT     WARMST,A
            JR      Z,NMIF           RESTART IS ZERO
            DEC     H
            JR      NZ,NMI0
            LD      HL,(TESTIND)     GO TO TEST ROM ?
            LD      A,INDIC
            CP      H
            JR      NZ,NMNTEST
            CP      L
            JP      Z,TESTAD
NMNTEST     IN      A,(MEMERC)       TURN ON ERROR LIGHT
            IN      A,(MEALO)
            LD      L,A
            IN      A,(MEAHI)
            LD      H,A
            LD      A,(HL)
            LD      (HL),A           READ CORRECTED BIT AND WRITE IT BACK (SOFT ERRO
            LD      (MERADR),HL
            LD      HL,ERRINT
            SET     0,(HL)
NMIME       POP     HL
            POP     AF
            RETN
NMIF        LD      HL,SWRMI         RAM WARM RESTART ?
            LD      A,INDIC
            CP      (HL)
            JP      NZ,NMI1
            INC     HL
            CP      (HL)
            JP      Z,WARMR          IT IS
NMI1        LD      HL,FWRMI         ROM WARM RESTART ?
            CP      (HL)
            JP      NZ,NMIME
            INC     HL
            CP      (HL)

JP      NZ,NMIME
WARMR       INC     HL
            LD      A,(HL)           GET ADDRESS FROM VECTOR
            INC     HL
            LD      L,(HL)           IN NUL ORDER
            LD      H,A
            LD      SP,STACK
            PUSH    HL               SAVE ADDRESS FOR RESTART
            POP     IX               NOW SAVE APPS START ADDRESS
WARM0       LD      BC,WARMDB        DEBOUNCE RESTART BUTTON
WARM1       IN      A,(NMISTA)
            BIT     WARMST,A
            JP      Z,WARM0
            DEC     BC
            LD      A,B
            OR      C
            JP      NZ,WARM1
            LD      HL,WARM2         GET OUT OF NMI MODE
```

```
               PUSH      HL
               RETN
    WARM2      LD        BC,1F8H            ZERO DEVICE TAB AND OTHER TO AREAS
               LD        HL,DEVTAB
               LD        DE,DEVTAB+1
               LD        (HL),0
               LDIR
               LD        A,2**ERRLCK+2**BRKLNK   SET UP LINK CONTROL PORT
               LD        (IOCTL),A
               LD        (LNKCTL),A
               IN        A,(LINK)           RESET UART INPUT
               CALL      PWRUP              SEND POWERUP MESSAGE
               EI
               PUSH      IX                 SET UP APPS FOR INTERPRETER
               JP        ZINT
    *
    FCHR       LD        B,A                SAVE CHAR FOR TESTING FOR CLOSE LINK REQUEST
               PUSH      IX                 SAVE INDEX REGISTER IX
               LD        A,(IOCTL)
               BIT       TIMCHK,A           WAITING FOR TIMEOUT SO THIS IS RESPONSE
               JP        NZ,RESPNS
               BIT       RECSET,A           SEE IF CLOSEL COMMAND WAS RECEIVED SO DATA COME
               LD        A,B                GET FIRST READ CHAR BACK FOR RESPONSE TEST
               JP        NZ,RECEIVE
               JP        RECCLSL            MESSAGE TO RECEIVE
    WAITGAP    LD        A,(IOCTL)          SET UP TO WAIT FOR NEXT GAP
               AND       2**BRKLNK+2**ERRLCK     LEAVE ERROR LOCKOUT AS IT WAS
    WAITGPS    LD        (IOCTL),A
               OUT       (LNKCTL),A
               EXX                          SWAP REG BANKS BACK
               EX        AF,AF'
               POP       IX
               EI
               RET
    *          GAP INT
    GAPINT
               LD        A,(IOCTL)
               BIT       RECSET,A           ARE WE WAITING FOR BIDDING TO END?
               JP        NZ,GAPEX
               BIT       TIMCHK,A           TIMEOUT1 OCCUR?
               JP        NZ,TIMOUT1
               BIT       GAPCK,A            PROTOCOL GAP?
               JP        NZ,GAP
               OR        2**GAPCK+2**FCHREN      NEXT GAP IS PROTOCOL GAP.
               LD        (IOCTL),A

OUT       (LNKCTL),A
               IN        A,(LINK)           MAKE SURE ANY LEFTOVER CHAR IS CLEARED
    GAPEX      EX        AF,AF'
               EI
               RET
    GAP        EXX                          FINISH SWAPPING BANKS
               PUSH      IX                 AND SAVE IX REG
               LD        B,A                SAVE IOCTL STATUS
               LD        HL,NAKS            SEE IF LAST DSB DONE OR IF THERE IS ANOTHER T(
               LD        A,(HL)
               INC       HL
               INC       HL
               OR        (HL)               SEND (NXTDSB NOT NULL)
               JP        Z,INTRETE
               IN        A,(LINKST)         MAKE SURE NOONE SENT CHAR ALREADY
               AND       LNKIRD
               JP        NZ,BIDLST
               SET       BRKLNK,B           BREAK THE LINK TO BID
               LD        A,B
               OUT       (LNKCTL),A
               LD        (IOCTL),A
               IN        A,(LINKST)         DID SOMEONE GET LINK BEFORE US?
               AND       LNKIRD
               JP        Z,BID
```

```
BIDLST  IN      A,(LINK)
        JP      RECBRK          TEST IF CHAR WAS CLOSE LINK CHAR
BID     LD      A,CLOSEL        REQUEST CURRENT LINK 'CONTROLLER' TO CLOSE
        CALL    PUTCHR
        IN      A,(ALNADR)      AND SEND BID TO MAKE SURE WE ARE ONLY SENDER
        LD      E,A
        CALL    PUTCHR
BID1    CALL    TIMEO
        JP      Z,WAITGAP       IF NO RESPONSE THEN LINK IS OPEN YET SO WAIT
        CP      CLOSEL          MAKE SURE CHAR IS A CLOSE CHAR
        JP      NZ,BID1
        CALL    TIMEO           SEE IF WE WON BID BUT DON'T WAIT FOREVER
        JP      Z,WAITGAP
        CP      E               WHAT ADDRESS CAME IN
        JP      M,RECCC         LOST BID . CLOSE LINK AND WAIT FOR START CHAR
        JP      Z,BID2          WON BID SO SEND DATA
        LD      B,16            DELAY BEFORE REBIDDING
        DJNZ    $
        JP      BID
BID2    LD      HL,NAKS         SEE IF NEW DSB TO SEND
        LD      A,(HL)
        OR      A
        JP      Z,BID3
        LD      IX,(SNDDSB)
        JP      BID4
BID3    LD      IX,(NXTDSB)     GET DSB TO SEND AND SAVE
        LD      (SNDDSB),IX
        LD      A,(IX+INRECL)   UPDATE TRANSMIT QUEUE
        DEC     (HL)            SET NAKS TO SEND CORRECT NUMBER OF TIMES
        INC     HL              POINT PAST 'NAKS' TO NXTDSB
        LD      (HL),A          SAVE UPDATED NXTDSB POINTER
        INC     HL
        LD      A,(IX+INRECL+1)
        LD      (HL),A
BID4    CALL    SENDM
        LD      A,(LOCTL)       SET LOCTL TO ALLOW TIMEOUT1 AND FCHR
        OR      2**TIMCHK
        OUT     (LNKCTL),A
        LD      (LOCTL),A

INTRETE POP     IX              RETURN FROM INT WITH FIRST CHAR INT ENABLED
        EXX
        EX      AF,AF'
        EI
        RET
*
TIMOUT1 EXX                     SAVE BANK
        PUSH    IX              AND INDEX
        LD      IX,(SNDDSB)     DSB THAT WAS TIMED OUT
        SET     DITM,(IX+DSBSTA)        INDICATE TIMEOUT IN DSB STATUS
        LD      HL,NAKS         BUMP NAK COUNT
        DEC     (HL)
        JP      NZ,EXITIO2      IF NOT RETRY MESSAGE/COMMAND
EXITIO  CALL    REMDSB          IF SO THEN FINISH I/O ON DSB
EXITIO1 LD      HL,NAKS         ZERO NAKS TO INDICATE DONE SENDING DSB
        LD      (HL),0
EXITIO2 LD      A,(LOCTL)
        AND     2**ERRLCK+2**BRKLNK     CLEAR ALL BITS EXCEPT ERROR LOCKOUT
        OR      2**FCHREN       NEXT CHAR IN SHOULD BE A BID. SO WE WAIT
                                ; FOR IT SO WE CAN CLOSE LINK (IN RECEIVE)
        JP      WAITGPS
*
*       RESPONSE COMING IN FROM COMMAND
RESPNS  LD      IX,(SNDDSB)
        LD      A,(LOCTL)       CLOSE LINK SO RESPONSE CAN GO AROUND
        RES     BRKLNK,A
        OUT     (LNKCTL),A
        LD      A,B             GET INPUT CHAR
        CALL    RDRES
        LD      A,(LOCTL)       OPEN LINK AGAIN
```

```
            OUT     (LNKCTL),A
            LD      A,D             GET RESPONSE STATUS
            OR      (IX+DSBSTA)     UPDATE TEMPORARY STATUS
            LD      (IX+DSBSTA),A
            BIT     DACK,D          ACK?
            JP      Z,RNAK
RESOK1      LD      A,(IX+INBUFL)   SEE IF THIS IS ALL THAT WAS EXPECTED
            OR      (IX+INBUFL+1)   (IE EXPECTED INPUT LENGTH=0)
            JP      Z,EXITIO        IF SO THEN END THIS DSB
            JP      EXITIO1         ELSE WAIT FOR 'DONE' FROM OTHER DEVICE
RNAK        BIT     DNAK,D          NAK?
            JP      Z,RBSY
RNAK1       LD      HL,NAKS         UPDATE NAK COUNT
            DEC     (HL)
            JP      Z,EXITIO        TOO MANY NAKS ?
            JP      EXITIO2         RETRY XMISSIONS
RBSY        BIT     DBUSY,D         DEVICE BUSY
            JP      Z,REND
            LD      A,(IX+DSBSTA)   SEE MIS-COMMUN. CAUSED NAK OR TIMEOUT
            AND     2**DNAK
            JR      NZ,RESOK1       THEN WE ASSUME AN ACK WAS GOOFED UP
            JP      RNAK1           ELSE DEVICE IS BUSY RETRY
REND        BIT     DDEND,D         END ?
            JP      NZ,EXITIO       IF NOT A DEVICE END SEE IF DATA WAS GOOD
            BIT     DBADD,D         BAD DATA?
            JR      Z,RDACK         NO SO WE RECEIVED DATA. ACK IT
            LD      B,NAKCHR        NAK BAD DATA
            CALL    SNDANE
            JP      EXITIO1
RDACK       LD      B,ACKCHR
            CALL    SNDANE
            JP      EXITIO
*

*       - READ RESPONSE TO COMMAND FROM LINK
RDRES0
            CALL    GETCHR
RDRES       LD      C,A             SAVE CHAR FOR TESTING
            CP      STCHR           IF CHAR IS ZERO THEN IT IS START SO SKIP IT
            JP      Z,RDRES0
            CP      80H             80H AND ABOVE ARE ADDRESSES
            JP      P,RDMES
            CALL    GETCHR
            CP      80H
            JP      P,RDMES         REDUNDANT CHAR SHOWS ERROR
            LD      B,2             SEE IF ACK/NAK/END
RDTYP       CP      ACKCHR
            JR      NZ,RDNAK
            LD      D,2**DACK
            RET
RDNAK       CP      NAKCHR
            JR      NZ,RDEND
            LD      D,2**DNAK
            RET
RDEND       CP      ENDCHR
            JR      NZ,RDBSY
            LD      D,2**DDEND
            LD      (IX+DEVSTA),0   NO ERROR FROM DEVICE
            RET
RDBSY       CP      BSYCHR          DEVICE BUSY RESPONSE ?
            JP      NZ,RDNXT
            LD      D,2**DBUSY
            RET
RDNXT       LD      A,C
            DJNZ    RDTYP
            LD      D,2**DNAK       IF NONE OF ABOVE ASSUME IT WAS A NAK
            RET
RDMES       CALL    GETCHR          GET SECOND 'TO' ADDRESS
            CALL    GETCHR          GET FROM ADDRESS
            CALL    READLNK         READ DATA
```

```
            RET
*           SEND COMMAND MESSAGE TO LINK
SENDM       SET     OPT,(IX+DSBSTA)   INDICATE DSB WILL BE READY TO RECEIVE
            LD      H,(IX+OBDPTR)     OUTPUT BUFFER DESCRIPTOR ADDRESS
            LD      L,(IX+OBDPTR+1)
            LD      A,STCHR           SEND START CHAR
            CALL    PUTCHR
            LD      A,(IX+DEVICE)     'TO' ADDRESS
            CALL    PUTCHR
            CALL    PUTCHR
            IN      A,(ALNADR)        SEND 'FROM' ADDRESS
            LD      B,A               START LRC/HASH
            LD      C,A
            CALL    PUTCHR
            LD      A,(IX+DSBCOM)     SEND COMMAND
            CALL    PUTCHR
            PUSH    BC                SAVE LRC/HASH ON STACK
            LD      A,H
            OR      A                 SEE IF OUTPUT BUFFER TO SEND OR SKIP ONLY
            JP      Z,SNDLRC
SNDBUF      LD      A,(HL)            SEND NEXT OUTPUT BUFFER IF ANY (IE <>0)
            OR      A
            JP      Z,SNDLRC          IF NONE SEND LRC/HASH
            LD      D,A               BUFFER ADDRES AND LENGTH
            INC     HL
            LD      E,(HL)
            INC     HL

LD      B,(HL)
            INC     HL
            LD      C,(HL)
            INC     HL
            EX      (SP),HL           PUT OBDPTR ON STACK/ GET LRC/HASH IN HL
            JP      SNDOCK            GO TEST IF ZERO CHARS TO SEND
SNDNXT      IN      A,(LTNKST)        SEND NEXT CHAR
            AND     LNKURD
            JR      Z,SNDNXT
            LD      A,(DE)
            OUT     (LTNK),A
            XOR     H                 UPDATA LRC
            LD      H,A
            LD      A,(DE)            UPDATE HASH
            ADD     A,L
            LD      L,A
            INC     DE                NEXT BYTE
            DEC     BC                IS ALL OF THIS BUFFER SENT
SNDOCK      LD      A,B
            OR      C
            JR      NZ,SNDNXT
            EX      (SP),HL           YES, GET NEXT POINTER IN OPDPTR TO BUFFER
            JR      SNDBUF
SNDLRC      POP     HL                GET LRC/HASH FROM STACK
            LD      A,H               SEND LRC
            XOR     (IX+DSBCOM)       (INCLUDE COMMAND SENT)
            CALL    PUTCHR
            LD      A,L
            ADD     A,(IX+DSBCOM)     (INCLUDE COMMAND IN HASH ALSO)
            CALL    PUTCHR            SEND HASH
CLRUART     CALL    GETCHR            CLEAR ANY CHARS FROM TRANSMIT COMING AROUND
            JR      NZ,CLRUART
            RET
*
*           REMOVE DSB FROM DEVICE ACTIVITY LIST . IX POINTS AT IT
REMDSB      SET     DONE,(IX+DSBSTA)  SET DONE FIRST
            RES     OPT,(IX+DSBSTA)   CLEAR DATA PENDING BIT
            LD      HL,IOCTL          SEE IF UNKNOWN DSB WAS USED (DSBX)
            BIT     UNKREC,(HL)
            JR      Z,REMO
            LD      HL,DSBX           IT WAS
            JR      REM1
```

```
REM0    LD      H,DEVTAB/256        DEVTAB ON 256 BYTE BOUNDARY
        LD      L,(IX+DEVICE)
        SLA     L                   2 BYTE WIDE VECTOR
REM1    LD      D,(IX+DSBLNK)       COPY DSBLNK TO DEVICE ACTIVITY LIST
        LD      (HL),D
        LD      A,D                 NUL LINK ?
        OR      A
        JP      Z,REMINT
        INC     HL
        LD      E,(IX+DSBLNK+1)
        LD      (HL),E
        CALL    INSDSB              INSERT THIS NEW DSB ON READY TO SEND LIST.
*                                   DE HOLDS ADDRESS AS IS REQUIRED
*       IF INTERRUPT ADDRESS IS SET IN DSB THEN PUT DSB ON NUL INTERRUPT LIST
*       NOTE THAT IX IS DESTROYED. (NO LONGER POINTS AT FRONT OF DSB)
REMINT  LD      A,(IX+INTADR)
        OR      A
        RET     Z                   IF ZERO THEN INT ADR NOT SET
        LD      DE,DSBLNK           POINT AT DSB LINK FOR INTERRUPT LINKED LIST
        ADD     IX,DE
        LD      HL,(INTHEAD)        IF INTHEAD=NUL THEN

LD      A,H
        OR      A
        JR      NZ,ADDTAIL
        LD      (INTHEAD),IX        INTHEAD = DSB
        LD      HL,INTLSW           INTERRPUT PENDING IS SET
        SET     0,(HL)
        JR      ADDONE
ADDTAIL PUSH    IX                  ELSE
        POP     DE
        LD      HL,(INTAIL)
        LD      (HL),D
        INC     HL
        LD      (HL),E
ADDONE  LD      (INTAIL),IX         INTAIL=DSB
        LD      (IX+0),0
        RET
*
*       INSDSB PUTS A DSB IN READY TO SEND QUEUE LINKED THROUGH
*              THE INRECL FIELD OF DSB
*       NOTE THAT IF (DE)=0 THEN ROM LOCATION 0 IS ACCESSED BUT IT WILL
*       CAUSE A RETURN AS A 'C3' IS THERE AND THAT LOOKS LIKE DPI=1
INSDSB  LD      A,(DE)              SEE IF DPI BIT ALREADY SET IF SO
        BIT     DPI,A               NO NEED TO QUEUE FOR TRANSMISSION
        RET     NZ
        LD      HL,(NXTDSB)         SEE IF QUEUE EMPTY
        LD      BC,INRECL+1
        LD      A,H
        OR      A
        JP      NZ,INSLST           IF NOT ADD AT END ELSE ADD AT FRONT
        LD      (NXTDSB),DE
        LD      (LSTDSB),DE         AND REAR
        JP      INSZER
INSLST  LD      HL,(LSTDSB)         GET LAST DSB AND LINK TO NEW LAST
        ADD     HL,BC
        LD      (HL),D              STORE IN Z80 WORD ORDER
        DEC     HL
        LD      (HL),E
        LD      (LSTDSB),DE         SAVE NEW LAST POINTER
INSZER  LD      H,D                 POINT NEW LAST DSBS INRECL TO NULL
        LD      L,E
        ADD     HL,BC
        LD      (HL),0              AGAIN Z80 ORDER
        RET
*
*       FIRST CHAR INT IMPLIES RECEIVING A MESSAGE/COMMAND FROM LINK
*          BECAUSE WE DID NOT HAVE ANYTHING TO SEND OR WE LOST BID FOR LINK
RECCLSL LD      A,B                 SEE IF FIRST CHAR IS CLOSELINK CHAR
RECBRK  CP      CLOSEL              IF NOT THEN 'CHAR' MUST BE NOISE GLITCH
```

```
              JP     NZ,WAITGAP         SO IGNORE AND WAIT FOR ANOTHER GAP
RECCC         LD     A,(IOCTL)          INDICAT CLOSELINK CHAR WAS RECEIVED
              SET    RECSET,A
              RES    BRKLNK,A           MAKE SURE LINK IS CLOSED AND WAIT FOR INPUT
              JP     WAITGPS            NOW WAIT FOR DATA TO COME IN
RECSC         CALL   TIMEO              GET START CHAR
              JP     Z,INTRETE          TIMED OUT, SO IGNORE
RECEIVE       CP     STCHR              START CHAR?
              JR     NZ,RECSC
              IN     A,(ALNADR)         SEE IF MESSAGE TO US. COMPARE TO OUR ADDRESS
              LD     C,A
              CALL   GETCHR
              JP     Z,WAITGAP          IF NO CHAR CAME THEN IGNORE
              LD     D,0                INDICATE NOT POWERUP DEVICE (YET)
              CP     C

JR     Z,RECRED           IF TO US CHECK REDUNDANT ADDRESS
              CP     OVRADR             ELSE SEE IF POWERUP MESSAGE. (TO COMPLETE DSB)
              JP     NZ,WAITGAP
              LD     C,OVRADR
              LD     D,2**DPUP
RECRED        CALL   GETCHR
              JP     Z,WAITGAP
              CP     C                  (REDUNDANT 'TO' ADDRESS)
              JP     NZ,WAITGAP
              CALL   GETCHR             GET FROM ADDRESS
              LD     C,A                SAVE IN CASE NEEDED FOR 'UNKNOWN' DSB
              ADD    A,A                SEE IF SENDER HAS DSB IN DEVICE ACTIVITY LIST
              LD     H,DEVTAB/256       DEVICE ACT. TAB. IS ON 256 BYTE BOUNDARY
              LD     L,A
              LD     A,(HL)
              OR     A
              JP     NZ,RECRED          GET DSBPTR
              BIT    DPUP,D             SEE IF POWERUP MESSAGE. IF SO IGNORE
              JP     NZ,WAITGAP
              LD     HL,IOCTL           INDICATE UNKNOWN DSB RECEIVED
              SET    UNKREC,(HL)
              LD     HL,(DSBX)          GET 'UNKNOWN' DSBPTR AND CHECK IT
              LD     A,L
              OR     A                  'UNKNOWN' EXISTS?
              JP     Z,RECBSY           NOPE
              LD     L,H                REVERSE ORDER OF HL (ORIG. ORDER WAS NOT Z80)
              LD     H,A
              PUSH   HL
              INC    HL                 SAVE 'UNKNOWN' ADDRESS
              LD     (HL),C
              IN     A,(LINK)                NO NEED TO TEST STATUS BECAUSE OF DELA
              JP     RECRDY                  BETWEEN CHARS CAUSED BY CODE
RECRED        CALL   GETCHR             GET STATUS CHAR HERE TO PREVENT OVERRUN
              LD     A,(HL)             SEE IF DSB STATUS IS BUSY(COMMAND SENT)
              INC    HL
              LD     C,(HL)                AND NOT JUST WAITING TO SEND
              PUSH   BC                 GET DSB IN IX REG
RECRDY        POP    IX
              BIT    DPI,(IX+DSBSTA)
              JP     Z,RECBSY           NO COMMAND ISSUED SO IGNORE
              BIT    DPUP,D
              JP     NZ,RECXIT
              CALL   READDTA            READ MESSAGE THAT COMES IN
              BIT    DBADD,D            WAS DATA BAD (LRC/HASH INCORRECT)
              JR     NZ,RECNAK          NAK IF IT WAS
              LD     A,ACKCHR           ELSE ACK
              CALL   SNDANE
RECXIT        LD     (IX+DSBSTA),D      SET STATUS BEFORE DSB REMOVAL
              CALL   REMDSB             SINCE DSB IS SATISFIED, REMOVE IT FROM ACTIVITY
              JP     WAITGAP                LIST
RECNAK        LD     A,NAKCHR
              CALL   SNDANE
              DEC    (IX+DSBNAK)        TOO MANY NAKS SENT
              JP     Z,RECXIT
```

```
           JP      EXITTO2
RECBSY     BIT     DPUP,0
           JP      NZ,WAITGAP
           CALL    CLRUART
           LD      A,BSYCHR        BUSY CHAR
           CALL    SNDANE
           JP      WAITGAP
;
;          READ THE DATA COMING IN FROM LINK USING BUFFER IN DSB POINTED TO BY
;          IX REG. SET FLAGS IN DSB ACCORDING TO 'CORRECTNESS' OF DATA (LRC/HASH)
READLNK    LD      B,CHRDLY        TIMEOUT ON CHAR IF NONE COME
           IN      A,(LTNKST)
           AND     LNKIRD
           JP      NZ,READDS       A CHAR CAME (DEVICE STATUS OR COMMAND )
           DJNZ    READLNK+2
           JP      READRADI        NO CHAR CAME AND IT SHOULD HAVE
READDS     IN      A,(LINK)
READDTA    PUSH    AF              SAVE DEVICE STATUS TILL WE ARE SURE OF GOOD REC
           LD      D,(IX+INBUFA)   GET INPUT BUFFER ADDRESS
           LD      E,(IX+INBUFA+1)
           LD      B,(IX+INBUFL)   GET BUFFER MAX LENGTH
           LD      C,(IX+INBUFL+1)
           LD      H,A             START LRC,HASH
           LD      L,A             NOTE THAT 'FROM' ADDRESS NEEDS TO BE INCLUDED
           PUSH    BC              SAVE LENGTH
READNXT    LD      B,CHRDLY        GET NEXT CHAR UNTIL DONE
           IN      A,(LTNKST)
           AND     LNKIRD
           JP      NZ,READGOT
           DJNZ    READNXT+2       NO CHAR OR TIMEOUT YET
READONE    EX      DE,HL
           LD      B,(IX+DEVICE)   INCORPORATE 'FROM' ADDRESS IN LRC/HASH
           LD      A,D
           XOR     B
           LD      D,A
           DEC     HL              CALC(LRC)=INPUT(HASH)
           CP      (HL)
           JP      NZ,READBAD      NO MATCH MEANS BAD DATA
           LD      A,E
           ADD     A,B
           SUB     D               INPUT(HASH)=CALC(LRC). REPLACE SUB(HL)
           DEC     HL              INPUT(HASH)=CALC(HASH)-INPUT(HASH)-INPUT(LRC)
           SUB     (HL)
           CP      D
           JP      NZ,READBAD
           POP     DE              FIND THE INPUT LENGTH
           INC     DE              DELETE COUNT OF LRC/HASH
           INC     DE
           LD      H,(IX+INBUFL)
           LD      L,(IX+INBUFL+1)
           XOR     A               CLEAR CARRY
           SBC     HL,DE
           LD      (IX+INRECL),H   SAVE THE INPUT LENGTH IN DSB INPUT LENGTH
           LD      (IX+INRECL+1),L
           LD      D,2**DPI        DATA IS GOOD, CLEAR STATUS BITS
           POP     AF              GET DEVICE STATUS FROM STACK AND INTO DSB
           LD      (IX+DEVSTA),A
           RET
READGOT    IN      A,(LINK)        READ THE CHAR
           LD      (DE),A          SAVE IT IN BUFFER
           XOR     H               LRC
           LD      H,A
           LD      A,(DE)
           ADD     A,L             HASH
           LD      L,A
           INC     DE
           EX      (SP),HL         DEC INPUT COUNT
           DEC     HL
```

```
            LD      A,H
            OR      L
            EX      (SP),HL
            JR      NZ,READNXT

CALL    GETCHR          SHOULD BE NO MORE CHARS
            JR      Z,READONE
READCLR     CALL    CLRUART
READBAD     POP     HL              REMOVE CHAR COUNT FROM STACK FOR RETURN
            POP     HL              REMOVE DEVICE STATUS FROM STACK AND DISCARD
READBAD1    LD      D,2**DBADD      BAD DATA RECEIVED
            RET
*
*           UTILITY I/O ROUTINES USED IN VARIOUS LOCATIONS ABOVE
PUTCHR      PUSH    AF              OUTPUT CHAR IN A TO LINK
            IN      A,(LINKST)
            AND     LNKORD
            JR      Z,PUTCHR+1
            POP     AF
            OUT     (LINK),A
            RET
TIMEO       LD      B,TIMDLY        TIMEOUT0 WAITING FOR A CHAR ONLINK
            JP      GETCHR+2
GETCHR      LD      B,CHRDLY-1      GET A CHAR FROM LINK OR TIMEOUT IF NONE (Z SET)
            IN      A,(LINKST)
            AND     LNKIRD
            JR      NZ,GETCH1
            DJNZ    GETCHR+2
            RET
GETCH1      IN      A,(LINK)
            RET
SNDANE      LD      A,(IOCTL)       OPEN LINK FOR SENDING RESPONSE
            SET     BRKLNK,A
            OUT     (LNKCTL),A
            LD      A,STCHR         SEND SHORT RESPONSE (ACK/NAK/END DEPENDING ON B
            CALL    PUTCHR
            LD      A,B
            CALL    PUTCHR
            CALL    PUTCHR          RETURN FROM PUTCHR RETURNS FROM SNDANE
            LD      B,34            WAIT FOR CHARS TO COMPLETE TO CLOSE LINK
            DJNZ    $
            LD      A,(IOCTL)
            OUT     (LNKCTL),A
            RET
*
*           CODE FOR CRT CONTROLLER FOLLOWS
*
*
*

TITLE   'ALINE CONSOLE CONTROLLER V2.1'
*
*           ALINE CONSOLE CONTROLER NEW PROTOCOL
*           AUTHOR JOE KUBLER
*
*           HISTORY
*
*           MAR 31,1980     CUSTOMER DISPLAY ADDED
* V2.0      ADD POWER UP RESET MESSAGE
*
* V2.1      CHANGE CUSTOMER DISP TO BE NON-INTERRUPT DRIVEN BECAUSE OF
*           TIMING PROBLEMS WITH LINK PROTOCOL
*
*           FLAG 1 INDICATES THAT A KEY HAS BEEN READ BUT NOT SENT .
*
SUB         MACRO   AC,VAL
            CPL     AC
            ADD     AC,VAL
            CPL     AC
```

```
        ENDM
DVRADR  EQU     7EH             POWER UP RESET MESSAGE TO ADDRESS
ACKCHR  EQU     78H
NAKCHR  EQU     19H
ENDCHR  EQU     55H
RSYCHR  EQU     2CH
CLOSEL  EQU     55H
STCHR   EQU     5EH             START CHAR
MAXNAK  EQU     255             MAXIMUM RETRIES OF MESSAGE/RESPONSE.
GAPREC  EQU     94              TIMEOUT FOR GAP IN PROTOCOL
GAPSND  EQU     90              EXTRA TIME BEFORE PROTOCOL ALLOWS SENDING
TIME1   EQU     112             TIMEOUT1
TIME0   EQU     25              TIMEOUT0
CDTSP   EQU     49              CUSTOMER DISPLAY BUFF AT MID STACK
KEYBUF  EQU     CDTSP+4         KEYRETURN BUFFER NEEDS 3 BYTES
SAVBA   EQU     KEYBUF+6
BUFA    EQU     29              INPUT BUFFER ADDRESS
KOTIM   EQU     140             MAXIMUM TIME TO WAIT FOR EMPTYING KEY BUFFER
CDOFF   EQU     0F7H
CDON    EQU     8
        ANL     P2,#7FH         CLOSE LINK
        ENT0    CLK
        CALL    INIT            INIT DISPLAY
        JMP     BEGIN
        ORG     7
        DJNZ    R6,TRET
        ORL     P1,#2           TURN OFF CASH DRAW SOLENOID
        STOP    TCNT
TRET    RETR
BEGIN   MOV     R0,#CDTSP
        MOV     @R0,#0
        CPL     F1
        MOV     R0,#KEYBUF      SEND POWER UP RESET MESSAGE
        MOV     @R0,#1
        INC     R0
        MOV     @R0,#DVRADR
        INC     R0
        ANL     P1,#7FH
        IN      A,BUS
        ORL     A,#1
        MOV     @R0,A
        MOV     R7,#1           ONLY 1 TRY ON THIS MESSAGE
        JMP     GAP
SETNAK  MOV     R7,#MAXNAK
GAP     ORL     P1,#0F1H
        ORL     P2,#07FH        GET ALINE ADDRESS
        ANL     P1,#7FH
        IN      A,BUS           ALINE ADDRESS
        ANL     A,#0FEH         IGNORE LOW BIT
        MOV     R3,A            SAVE ADDRESS
        ORL     P1,#80H         DESELECT ADDRESS
        ANL     P1,#0DFH        SELECT UART
        MOV     R0,#BUFA             INPUT BUFFER POINTER
GAPST   MOV     R2,#GAPREC      FIRST PART OF 2 MSEC GAP WAITED OUT HERE
GAPT    JT1     GAPC            TIME OUT PAST ALL CHARS
        DJNZ    R2,GAPT
        JMP     GAPD
GAPC    IN      A,BUS           IGNORE CHAR
        JMP     GAPST
GAPD    MOV     R1,#CDTSP       SEE IF ANY DATA TO SEND
        MOV     A,@R1           CUSTOMER DISPLAY ?
        JNZ     BREAK
        MOV     R1,#KEYBUF      KEY

MOV     A,@R1
        JNZ     TRANS
READ    CALL    GETCHR
        JC      GAPD
        XRL     A,#CLOSEL       REQUEST TO CLOSE LINK
```

```
           JNZ    GAP
GOTCLI     ANL    P2,#7FH            CLOSE LINK
RCHR       CALL   GETCHR             GET THE CHAR SENT. LOOK FOR START CHAR
           XRL    A,#STCHR
           JNZ    RCHR               NO, THEN BID IS NOT OVER
           CALL   GETCHR             THIS DEVICE ADDRESSED?
           MOV    R5,A               SAVE TO VERIFY THAT DEVADR OR DEVADR+1 ADDRESS!
           ANL    A,#0FEH
           XRL    A,R3
           JNZ    GAP
           CALL   GETCHR             REDUNDANT ADDRESS CHAR
           XRL    A,R5
           JNZ    GAP
           MOV    A,R5               SAVE DEVICE ADDRESS THAT WAS ADDRESSED
           MOV    R3,A
           MOV    R4,#0              CLEAR LRC,HASH
           MOV    R5,#0
           CALL   RDATA              READ IN THE DATA AT R0
RDONE      DEC    R0                 CHECK LRC. CALC(LRC) = REC(HASH)
           MOV    A,@R0
           XRL    A,R4
           JNZ    NAK                BAD LRC
           DEC    R0                 FIX HASH. CALC(HASH)=HASH+REC(LRC)+REC(HASH)
           MOV    A,R5
           SUB    A,@R0
           INC    R0
           SUB    A,@R0
           XRL    A,@R0
           JNZ    NAK
           JMP    COMMAND
NAK        MOV    R2,#NAKCHR         NAK SENDER
           CALL   ACKNAK
           JMP    GAP
DENO       MOV    R2,#ENDCHR
           JMP    ACKNAK
BUSY       MOV    R2,#BSYCHR         SEND BUSY TO SENDER
           CALL   ACKNAK
           JMP    SETNAK
RDATA      MOV    R2,#10             TIMEOUT COUNT FOR LAST CHAR
RDTIM      JF1    RGOT               MESSAGE CHAR
           DJNZ   R2,RDTIM
           RET
RGOT       IN     A,BUS              READ CHAR
           MOV    @R0,A              SAVE IN BUFFER
           XRL    A,R4               LRC CALC
           MOV    R4,A
           MOV    A,@R0
           ADD    A,R5
           MOV    R5,A
           INC    R0                 BUMP BUFFER POINTER
           JMP    RDATA
TRANS      JF1    TREDO              OTHERWISE SEE IF KEY IS ALREADY READ
           ORL    P1,#060H           SELECT KEY STATUS
           ANL    P1,#0BFH
           ORL    P2,#40H            SELECT STATUS
           IN     A,BUS
           JB0    XKEY
           ORL    P1,#060H           GO RECEIVE

ANL    P1,#0DFH           SELECT UART
           JMP    READ
TREDO      MOV    R1,#KEYBUF         ADDRESS OF REPEAT DATA
           JMP    BREAK              DON'T READ KEY
XKEY       ANL    P2,#0DFH           READ KEY
           IN     A,BUS
           MOV    R1,#KEYBUF+3       SAVE THE KEY
           MOV    @R1,A
           MOV    R1,#KEYBUF+4       GET KEY LOCK STATUS
           CALL   KLOCK1
           CPL    F1                 INDICATE KEY IS NOT YET SENT
```

```
           MOV     R1,#KEYBUF
BREAK      ORL     P1,#060H        SELECT UART
           ANL     P1,#0DFH
           JT1     READ            MAKE SURE NO CHAR HAS COME WHILE TESTING KB
           ORL     P2,#80H         BREAK LINK
           MOV     R2,#GAPSND      NOW WAIT ADDITIONAL 2 MSEC FOR SENDING
           INC     R3              SET R3 TO KEYBOARD ADDRESS (DEVADR+1)
BRKSND     JT1     READ            SEE IF ANYONE STILL SENDING OR BEAT US HERE
           DJNZ    R2,BRKSND
BID        MOV     R2,#CLOSED      BID FOR LINK. MUST OPEN ALL CLOSED DEVICES
           CALL    PUTCHR
           MOV     A,R3                    AND MAKE SURE WE ARE ONLY SENDERS
           MOV     R2,A
           CALL    PUTCHR
           CALL    GETCHR
BRKG       JC      GAP             WAIT FOR NEXT GAP
           XRL     A,#CLOSED
           JNZ     GAP
           CALL    GETCHR
           JC      GAP             ERROR, CHAR DID NOT COME
           CPL     A               SUBTRACT A FROM R3 (RECEIVED FROM OUR ADDR)
           INC     A
           ADD     A,R3
           JB7     BIDDLY          OUR ID IS LOWER SO REBID
           JNZ     GOTCH1          WE WON
           JMP     TBWON           CONFLICT. IE SOMEONE ELSE IS WAITING FOR US
BIDDLY     MOV     R2,#20          WAIT FOR LINKS TO BE CLOSED BEFORE REBID
           DJNZ    R2,$
           JMP     BID
TBWON      CALL    TSEND
           ORL     P2,#80H         MAKE SURE LINK IS OPEN
           JMP     SETNAK
TSEND      ORL     P2,#80H         BREAK LINK FOR RESPONSE
           MOV     A,R1            SET UP TO SEND PROPER RESPONSE
           MOV     R0,#SAVB4
           MOV     @R0,A
           MOV     R0,A
           MOV     A,@R0
           MOV     R1,A            GOT BUFFER IN R0 AND COUNT IN R1
           INC     R0
           MOV     R2,#STCHR       START CHAR
           CALL    PUTCHR
           MOV     A,@R0           TO ADDRESS
           MOV     R2,A
           CALL    PUTCHR
           CALL    PUTCHR          REDUNDANT
           INC     R0
           MOV     A,@R0           INIT LRC,HASH WITH FROM ADDRESS
           MOV     R4,A
           MOV     R5,A
           MOV     R2,A            AND SEND ADDRESS
           CALL    PUTCHR

MOV     R2,#0           STATUS BYTE
           CALL    PUTCHR
           DJNZ    R1,TDLOOP
           JMP     TDDONE
TDLOOP     INC     R0              SEND THE REST OF THE CHARS
           MOV     A,@R0           GET CHAR TO SEND
           MOV     R2,A
           CALL    PUTCHR          SEND IT
           XRL     A,R4            LRC IT
           MOV     R4,A
           MOV     A,R5            HASH
           ADD     A,@R0
           MOV     R5,A
           DJNZ    R1,TDLOOP       DATA COUNTER
TDDONE     MOV     A,R4            SEND LRC
           MOV     R2,A
           CALL    PUTCHR
```

```
                MOV     A,R5            SEND HASH
                MOV     R2,A
                CALL    PUTCHR
TOMPU           MOV     R1,#10          DELAY FOR UART(ASSUMES 1 LINK TIME USED ALREADY
                IN      A,BUS
TOMPUT          JT1     TOMPU
                DJNZ    R1,TOMPUT
                MOV     R1,#TIME1       WAIT FOR RESPONSE
TRES            JT1     RAKNAK
                DJNZ    R1,TRES
                JMP     RNAK            TIMEOUT ON DEVICE
RAKNAK          MOV     R0,#BUFA        INPUT BUFFER
                IN      A,BUS
                XRL     A,#STCHR        HAS TO BE A START CHAR
                JNZ     SRET
                ANL     P2,#7FH         CLOSE LINK TO LET REPONSE GO AROUND
                CALL    RDATA
                DEC     R0              TEST TWO CHARS
                MOV     R1,#2           TEST EACH CHAR
RCHK            MOV     A,@R0
                XRL     A,#ACKCHR
                JZ      RACK
                MOV     A,@R0
                XRL     A,#BSYCHR
                JZ      RACK
                MOV     A,@R0
                XRL     A,#NAKCHR
                JZ      RNAK
                DEC     R0              POINT AT NEXT CHAR
                DJNZ    R1,RCHK
RNAK            IN      A,BUS           MAKE SURE UART IS CLEAR AFTER TESTING LINK
                DJNZ    R7,SRET         TRY MAXNAKS TIMES
RACK            MOV     R0,#SAVBA       NO KEY WANTED AND NONE TO SEND
                MOV     A,@R0
                MOV     R0,A
                MOV     @R0,#0
SRET            RET
                TITLE   'ALINE PRINTER CONTROLLER V2.0'
*
*               ALINE 26 OR 40 COLUMN CHARACTER PRINTER. USES LINKLESS
*               PROTOCOL
*               AUTHOR JOE KUBLER
*               DATE WRITTEN:   8/28/79
*               V2.0
*               DETECT LOW PAPER AND COVER OPEN
*               6/06/80         POWER UP RESET MESSAGE IMPLEMENTED

SUB             MACRO   AC,VAL
                CPL     AC
                ADD     AC,VAL
                CPL     AC
                ENDM
DVRADR          EQU     7EH             POWER UP RESET MESSAGE TO ADDRESS
ACKCHR          EQU     78H
NAKCHR          EQU     19H
ENOCHR          EQU     55H
BSYCHR          EQU     2CH
CLOSEL          EQU     55H
STCHR           EQU     5EH             START CHAR
BUFA            EQU     14H             COMMAND INPUT/COMMAND END BUFFER
MAXNAK          EQU     255
GAPREC          EQU     98              TIMEOUT FOR GAP
GAPSND          EQU     90              ADDITIONAL TIME IN PROTOCOL FOR SENDING
TIME0           EQU     40              TIMEOUT 0 FOR PROTOCOL
TIME1           EQU     100
*
START           ANL     P2,#7FH         CLOSE LINK (POWER UP OPENS IT)
                CALL    PUTEST
                CPL     F0              SET UP POWERUP RESET MESSAGE
```

```
            MOV     R7,#1
            MOV     R0,#BUFA
            MOV     @R0,#DVRADR
            JMP     GAP
SETNAK      MOV     R7,#MAXNAK
GAP
            IN      A,P2            ALINE DEVICE ADDRESS
            ORL     A,#80H          ONLY LOW 7 BITS OF ADDRESS WERE SET
            MOV     R3,A                SAVE ADDRESS
            MOV     R0,#BUFA            INPUT BUFFER POINTER
GAPST       MOV     R2,#GAPREC          GAP TIME
GAPT        JT0     GAPC            TIME OUT PAST ALL CHARS
            DJNZ    R2,GAPT
            JMP     GAPD
GAPC        IN      A,BUS           IGNORE CHAR
            JMP     GAPST
GAPD        JF0     BREAK           SEND DONE
            IN      A,P1            PRINTER TEST BUTTON PRESSED?
            JB6     GAPCL
            JMP     /TEST
GAPCL       CALL    GETCHR
            JC      GAPD
            XRL     A,#CLOSEL
            JNZ     GAP             IF NOT CLOSE LINK REQUEST THEN INGNORE
            ANL     P2,#7FH         CLOSE LINK
RCHR        CALL    GETCHR          GET THE CHAR SENT. LOOK FOR START CHAR
            JC      RCHR
            XRL     A,#STCHR
            JNZ     RCHR            NO, THEN BID IS NOT OVER
            CALL    GETCHR          THIS DEVICE ADDRESSED?
            XRL     A,R3
            JNZ     GAP
            CALL    GETCHR          REDUNDANT ADDRESS CHAR
            XRL     A,R3
            JNZ     GAP
            JF0     BSY             SEND BSY IF LAST COMMAND NOT DONE
            MOV     R4,#0           CLEAR LRC,HASH
            MOV     R5,#0
            MOV     R6,#0           BYTE COUNT
            CALL    RDATA           READ IN THE DATA AT R0
RDONE       DEC     R0              CHECK LRC. CALC(LRC) = REC(HASH)

MOV     A,@R0
            XRL     A,R4
            JNZ     NAK             BAD LRC
            DEC     R0              FIX HASH. CALC(HASH)=HASH+REC(LRC)+REC(HASH)
            MOV     A,R5
            SUB     A,@R0
            INC     R0
            SUB     A,@R0
            XRL     A,@R0
            JNZ     NAK
            JMP     COMMAND
ACK         MOV     R2,#ACKCHR
ACKNAK      MOV     A,#STCHR
            ORL     P2,#80H         BREAK LINK FOR RESPONSE
            MOVX    @R1,A
ANW
            CALL    PUTCHR
            CALL    PUTCHR
            MOV     R2,#40
            DJNZ    R2,$
            ANL     P2,#7FH         CLOSE LINK AGAIN
            RET
NAK         MOV     R2,#NAKCHR      NAK SENDER
            CALL    ACKNAK
            MOV     R0,#BUFA        SET UP FOR POSSIBLE RE-RECEPTION
            JMP     GAP
DEND        MOV     R2,#ENDCHR
```

```
            JMP     ACKNAK
BSY         CALL    GETCHR
            JC      BSY
            MOV     R2,#BSYCHR
            JMP     ACKNAK
PUTCHR      JT1     S+4
            JMP     PUTCHR                  WAIT ON LAST CHAR
            MOV     A,R2
            MOVX    @R1,A                   OUTPUT WITHOUT BUS LATCH
            RET
GETCHR      MOV     R1,#TIMEO               TIMEOUT ON CHARS
            CLR     C
GETCHR1     JT0     GETCHR2                 INPUT CHAR FROM LINK
            DJNZ    R1,GETCHR1
            CPL     C
            RET
GETCHR2     IN      A,BUS
            RET
RDATA       MOV     R2,#15                  TIMEOUT COUNT FOR LAST CHAR
RDTIM       JT0     RGOT
            DJNZ    R2,RDTIM
            RET
RGOT        IN      A,BUS                   READ CHAR
            MOV     @R0,A                   SAVE IN BUFFER
            INC     R0                      BUMP BUFFER POINTER
            XRL     A,R4                    LRC CALC
            MOV     R4,A
            IN      A,BUS                   HASH CALC
            ADD     A,R5
            MOV     R5,A
            INC     R6                      COUNT BYTE
            JMP     RDATA
BREAK       MOV     R2,#GAPSND              WAIT TO SEND
BRKSND      JT0     GAPCL                   IF ANYONE BEAT US SEE WHAT THEY SENT
            DJNZ    R2,BRKSND
            ORL     P2,#80H                 BREAK LINK TO BID

BID         MOV     A,#CLOSEL               MAKE SURE OTHER DEVICES CLOSE LINK
            MOV     R2,#CLOSEL
            CALL    PUTCHR
            MOV     A,R3                    BID TO MAKE SURE OF ONLY ONE SENDER
            MOV     R2,A
            CALL    PUTCHR
            CALL    GETCHR
            JNC     BRKT
BRKG        JMP     GAP
BRKT        XRL     A,#CLOSEL
            JNZ     BRKG
            CALL    GETCHR                  SEE IF WE WON BID
            JC      BRKG                    TIMEOUT
            CPL     A                       SUBTRACT A FROM R3 (RECEIVED FROM OUR ADDR)
            INC     A
            ADD     A,R3
            JB7     BIDDLY                  OUR ID IS LOWER SO REBID
            JZ      TBWON                   WE WON
            ANL     P2,#7FH
            JMP     RCHK                    CONFLICT. IE SOMEONE ELSE IS WAITING FOR US
BIDDLY      MOV     R2,#20
            DJNZ    R2,S
            JMP     BID
TBWON       CALL    TSEND
            ORL     P2,#80H                 MAKE SURE LINK IS OPEN
            JT0     GAP
            JMP     SETWAK
*
            ORG     100H
TSEND       ORL     P2,#80H                 BREAK LINK FOR RESPONSE
            MOV     R0,#BUFA
            MOV     R1,#1
            MOV     A,R3
```

```
             MOV     R4,A
             MOV     R5,A
TOATA        MOV     R2,#STCHR       START CHAR
             CALL    PUTCHR
             MOV     A,@R0           TO ADDRESS
             MOV     R2,A
             CALL    PUTCHR
             CALL    PUTCHR          REDUNDANT
             MOV     A,R3            OUR ADDRESS (FIRST CHAR IN HASH LRC)
             MOV     R2,A
             CALL    PUTCHR
TOLOOP       INC     R0              SEND THE REST OF THE CHARS
             MOV     A,@R0           GET CHAR TO SEND
             MOV     R2,A
             CALL    PUTCHR          SEND IT
             XRL     A,R4            LRC IT
             MOV     R4,A
             MOV     A,R5
             ADD     A,@R0           HASH
             MOV     R5,A
             DJNZ    R1,TOLOOP       DATA COUNTER
             MOV     A,R4            SEND LRC
             MOV     R2,A
             CALL    PUTCHR
             MOV     A,R5            SEND HASH
             MOV     R2,A
             CALL    PUTCHR
TOMPU        MOV     R1,#15          DELAY FOR UART(ASSUMES 1 LINK TIME USED ALREADY
             IN      A,BUS
TOMPUT       JTO     TOMPU

DJNZ    R1,TOMPUT
             MOV     R1,#TIME1       WAIT FOR RESPONSE
TRES         JTO     RAKNAK
             DJNZ    R1,TRES
             JMP     RNAK            TIMEOUT ON LINK
RAKNAK       MOV     R0,#18H         INPUT BUFFER
             IN      A,BUS           SEE THAT START CHAR IS FIRST
             XRL     A,#STCHR        IF NOT THEN NOISE ON LINK SO IGNORE
             JNZ     SRET
             ANL     P2,#7FH         CLOSE LINK TO LET RESPONSE GO AROUND LINK
             CALL    RDATA
             DEC     R0              GET LAST CHAR IN BUFFER
             MOV     R1,#2           TEST EACH CHAR
RCHK         MOV     A,@R0
             XRL     A,#ACKCHR
             JZ      RACK
             MOV     A,@R0
             XRL     A,#BSYCHR
             JZ      RACK
             MOV     A,@R0
             XRL     A,#NAKCHR
             JZ      RNAK
             DEC     R0              POINT AT NEXT CHAR
             DJNZ    R1,RCHK
RNAK         IN      A,BUS           MAKE SURE UART IS CLEAR AFTER TESTING LINK
             DJNZ    R7,SRET         TRY AGAIN MAXNAKS TIMES
RACK         CLR     F0              DON'T WANT TO SEND ANYMORE
SRET         RET
             TITLE   'ALINE CRT CONTROLLER V1.1
*            ALNCRT  ALINE CRT CONTROLLER
*
*            HISTORY
*
*            AUTHOR  JOE KUBLER
*
*            VER 1.0 SEPT. 3,1979
*
*            VER 1.1 APRIL 3,1981
```

```
*       ADDED SELF TEST SOFTWARE
*
*
*               CONSTANTS
WRT      EQU     1        WRITE COMMAND FROM ALINE
KEYRD    EQU     2        READ KEY COMMAND FROM ALINK TO DEVICE ALINE ADDRESS+1
KEYRDY   EQU     1        KEYBOARD READY STATUS BIT
KEYST    EQU     11H      KEYBOARD STATUS PORT
KEYDB    EQU     10H      KEYBOARD DATA PORT
BUZZC    EQU     4        BUZZER ON COMMAND
CLRBUF   EQU     20H      CLEAR KEYS AND READ FIRST KEY COMMAND
KEYTIM   EQU     100      TIMEOUT TO CLEAR KEYS
BUZTIM   EQU     0A23H    BUZZER ON TEST TIMEOUT
ALSTAT   EQU     21H      ALINE UART STATUS INPUT PORT
ALIN     EQU     20H      ALINE INPUT
ALOUT    EQU     20H      ALINE OUTPUT
CRT      EQU     21H      CRT REFRESH ENABLE/HI LOW RAM SELECT
PROCRE   EQU     8        PROCESSOR RAM ENABLE VALUE (BIT 3)
CREG0    EQU     0
CREG1    EQU     1
CREG2    EQU     2
CREG3    EQU     3
CREG4    EQU     4
CREG5    EQU     5
CREG6    EQU     6

CXR      EQU     0CH      X CURSOR OF 5027
CYR      EQU     0DH      Y CURSOR OF 5027
CSTART   EQU     0EH      TRIGGER TO 5027 TO START DISPLAY
C5027    EQU     0AH      RESET 5027
ALDR     EQU     8        MASK FOR UART DR STATUS
ALTBR    EQU     10H      MASK FOR UART TBR STATUS
ALNADR   EQU     22H      ALINE ADDRESS
BUZZER   EQU     22H      BUZZER PORT ADDRESS
BUZZ     EQU     1        TURN BUZZER ON
GAPREC   EQU     51       TIME OUT FOR PROTOCOL GAP
GAPSND   EQU     51       TIME OUT FOR SENDING
TIM0     EQU     20       TIMEOUT0
TIM1     EQU     77       TIMEOUT1
CHRDLY   EQU     12       1 CHAR TIME 88 MICROSEC
                          POWER UP RESTART MESSAGE TO ADDRESS
DVRADR   EQU     7EH
MAXNAK   EQU     255      MAXIMUM NAKS
NAKCHR   EQU     19H
ACKCHR   EQU     78H
BSYCHR   EQU     2CH
CLOSEL   EQU     55H
STCHR    EQU     5EH
TSTCHR   EQU     1
BRKCHR   EQU     0C0H     BREAK LINK OUTPUT ON SOD
FIXCHR   EQU     40H      RESTORE LINK
EOBUF    EQU     3        END OF BUFFER MARKER
*        ATTRIBUTES FOR CRT ARE BY BIT
*        BIT      USE
*        0        HLINK
*        1        REVID
*        2        UNDERLINE
*
*        BIT 3 IS THE PROCESSOR/CRT ENABLE BIT. IT IS ALWAYS ON IN HATH
FHATR    EQU     PROCRE   INITIAL ATTRIBUTE VALUE
FSATR    EQU     80H      INITIAL 'SOFT' ATTRIBUTE VALUE
*                         IT IS AUTOCRLF
AUTOLF   EQU     80H
CURSOR   EQU     2        MASK FOR CURSOR ON BIT IN FSATR
BLANK    EQU     ' '
LINES    EQU     16       NUMBER OF LINES ON CRT
CHARS    EQU     40       NUMBER OF CHARS ON LINE
ACTWID   EQU     64       IN SMALL CRT EACH LINE IS STORED IN 64 BYTES
EXCESS   EQU     ACTWID-CHARS    EXTRA CHARS TO IGNORE AS A RESULT
CRTMEM   EQU     800UH
```

```
DSPLOC   EQU    R005H       LOCATION OF POWER UP VERSION MESSAGE
RAM      EQU    4000H
RAMLEN   EQU    03FFH
RAMPAT   EQU    55H         PATTERN FOR RAM TEST
TSTKEY   EQU    3           KEY CODE FOR SELF TEST
CR       EQU    0DH         CARRIAGE RETURN
LF       EQU    10          LINE FEED
ESC      EQU    1BH         ESCAPE CHAR
DEL      EQU    7FH         DELETE CHAR
TABC     EQU    9           TAB
*************************************************
SETNAK   MVI    A,MAXNAK    RE-INITIALIZE NAK COUNT
         STA    NAKS
GAP
READAL   IN     ALNADR      THIS DEVICES ADDRESS
         MOV    C,A
         MVI    B,GAPREC
GAP1     IN     ALSTAT      TIME OUT FOR GAP
         ANI    ALDR
         JNZ    GAPCLR

DCR    B
         JNZ    GAP1
         JMP    GOTGAP       GAP FOUND
GAPCLR   IN     ALIN         CLEAR CHAR, GET GAP
         JMP    GAP
GOTGAP   LDA    SYSREQ       DATA TO SEND ?
         ORA    A
         JNZ    BREAK        YES
GKEY     LDA    KEYMASK      WAITING FOR A KEY ?
         ORA    A
         JNZ    GETKEY
GET0     CALL   GETCHR
         JZ     GOTGAP
RCHR     IN     ALIN         SEE IF CLOSE LINK REQUEST
         CPI    CLOSEL
         JNZ    READAL       IF NOT THEN IT WAS NOISE ON LINK
RCLOSE   MVI    A,FIXCHR     ELSE MAKE SURE OUR LINK IS CLOSED
         SIM
WSTRT    CALL   GETCHR
         JZ     WSTRT
         CPI    STCHR        START CHAR ?
         JNZ    WSTRT
         CALL   GETCHR
         MOV    B,A
         ANI    0FFH         MASK BIT0 BECAUSE MAY BE TO CRT OR KEYBOARD
         CMP    C            TO US?
         JNZ    GAP          NOPE GET GAP
         CALL   GETCHR       REDUNDANT CHAR
         CMP    B
         JNZ    GAP          NOT TO US
         STA    RECDEV       DEVICE ADDRESS SAVED FOR ACK TEST BELOW
         LXI    D,0          ZERO LRC,HASH
         LXI    H,INBUFF     INPUT BUFFER
         CALL   RDATA        GET DATA
         DCX    H            CHECK LRC,HASH
         MOV    A,M
         CMP    D            INPUT(HASH)=CALC(LRC)
         JNZ    NAK
         ADD    A            CALC(HASH)=2*INPUT(HASH)+INPUT(LRC)
         DCX    H
         ADD    M
         CMP    E
         JNZ    NAK
         MVI    M,EOBUF      MARK END OF COMMAND
         LDA    RECDEV
         ANI    1            SEE IF CRT OF KEYB ADDRESS
         JNZ    AOKB
         LDA    SYSREQ       SEE IF CRT BUSY ALREADY
```

```
ADTBUSY  ORA    A
         JNZ    ADBUSY        SEND BUSY IF SO
         JMP    ACK           ELSE ACK
ADKB     LDA    COMMAND       CLEAR BUFFER COMMAND OVERRIDES RESPONSE
         ANI    CLRBUF
         JNZ    ACK
         LDA    KEYMASK       ELSE IF WAITING FOR A KEY THEN SEND BUSY
         JMP    ADTBUSY
ADBUSY   MVI    B,BSYCHR
         JMP    ACKNAK
ACK      MVI    B,ACKCHR      ACK SENDER

ACKNAK   MVI    A,BRKCHR      BREAK THE LINK FOR RESPONSE
         SIM
         MVI    A,STCHR       START CHAR
         OUT    ALOUT

MOV    A,B
         CALL   PUTCHR
         CALL   PUTCHR
         MVI    A,27          WAIT FOR CHARS TO COMPLETE BEFORE CLOSE
         DCR    A
         JNZ    $-1
         MVI    A,FIXCHR      CLOSE LINK AGAIN
         SIM
         RET
NAK      MVI    B,NAKCHR      NAK SENDER
         CALL   ACKNAK
         JMP    GAP
RDATA    MVI    B,CHRDLY      READ DATA
RDTIM    IN     ALSTAT        WAIT TILL A CHAR TIME PASSES
         ANI    ALDR
         JNZ    RGOT
         DCR    B
         JNZ    RDTIM
         RET
RGOT     IN     ALIN          SAVE CHAR
         MOV    M,A
         XRA    D             CALC    LRC
         MOV    D,A
         MOV    A,M
         ADD    E             CALC HASH
         MOV    E,A
         INX    H
         JMP    RDATA
GETCHR   MVI    D,TIMO
GETCHR1  IN     ALSTAT        READ A CHAR FROM ALINE
         ANI    ALDR
         JNZ    GETCHR2
         DCR    D
         JNZ    GETCHR1
         RET
GETCHR2  IN     ALIN
         RET
PUTCHR   PUSH   PSW           OUTPUT A CHAR TO ALINE
         IN     ALSTAT
         ANI    ALTBR
         JZ     PUTCHR+1
         POP    PSW
         OUT    ALOUT
         RET
BREAK    IN     ALSTAT        MAKE SURE NO CHAR HAS COME IN MEAN TIME
         ANI    ALDR
         JNZ    RCHR
         MVI    A,BRKCHR      BREAK LINK FOR TRANSMIT
         SIM
         MVI    B,GAPSND      WAIT SENDING GAP TIME BEFORE SENDING
BRKSND   IN     ALSTAT
         ANI    ALDR
         JNZ    RCHR
```

```
              DCR     A
              JNZ     BRKSND
BID           MVI     A,CLOSEL        REQUEST THAT LINK BE CLOSED
              OUT     ALOUT
              IN      ALNADR          AND BID
              MOV     C,A

CALL    PUTCHR
BIDIN         CALL    GETCHR          NOW WAIT FOR CLOSE LINK CHAR TO COME
              JZ      GAP
              CPI     CLOSEL

JNZ     READAL
              CALL    GETCHR          GET BID ADDRESS. IF NOTE COMES THEN ERROR
              JZ      GAP
              CMP     C               CHECK IF BID WON LOST
              JM      RCLOSE          LOST BID
              JZ      BIDWON
              MVI     B,16            100 MICROSEC DELAY TO ALLOW LINKS TO BE CLOSED
BIDDLY        DCR     B
              JNZ     BIDDLY
              JMP     BID
BIDWON        CALL    SEND
              MVI     A,BRKCHR        MAKE SURE LINK IS OPEN
              SIM
              JNZ     READAL          Z BIT CLEAR INDICATES NAK'D TRANSMISSION
              JMP     SETNAK          ELSE GOOD TRANS. RESET NAKS
*             Z BIT SET INDICATES GOOD TRANSMISSION
SEND          LHLD    MESSAGE         GET MESSAGE TO SEND
              MOV     C,M             GET LENGTH
              INX     H
              MVI     A,BRKCHR        BREAK LINK FOR RESPONSE
              SIM
              MVI     A,STCHR         START CHAR
              OUT     ALOUT
              LDA     TOADR           GET SENDERS ADDRESS TO WHOM REPLY GOES
              CALL    PUTCHR          TO ADDRESS
              CALL    PUTCHR          REDUNDANT TO ADDRESS
              LDA     DEVADR          FROM ADDRESS
              CALL    PUTCHR
              MOV     D,A             START LRC,HASH
              MOV     E,A
SNDLOP        MOV     A,M             SEND NEXT CHAR
              CALL    PUTCHR
              ADD     E               HASH CALC
              MOV     E,A
              MOV     A,M
              XRA     D               LRC CALC
              MOV     D,A
              DCR     C
              INX     H
              JNZ     SNDLOP
              CALL    PUTCHR          SEND LRC
              MOV     A,E
              CALL    PUTCHR          SEND HASH
              MVI     C,CHRDLY        CLEAR UART OF CHARS CRT SENT ON LINK
CLRUART       IN      ALSTAT
              ANI     ALDR
              JZ      CLRDEC
              IN      ALIN            CLEAR THEN CHAR
              JMP     CLRUART-2
CLRDEC        DCR     C
              JNZ     CLRUART
              MVI     C,TIM1          WAIT TILL TIMEOUT1 FOR RESPONSE
RESP          IN      ALSTAT
              ANI     ALDR
              JNZ     RAKNAK          SEE IF ACK/NAK
              DCR     C
              JNZ     RESP
              MVI     C,TIM0          SINCE NO RESPONSE TEST LINK FOR DOWN
              MOV     A,TSTCHR
```

```
             CALL   PUTCHR
TSTLNK       IN     ALSTAT
             ANI    ALDR
             JNZ    RNAK

DCR    C
             JNZ    TSTLNK
             INR    C          CLEAR Z BIT TO SHOW BAD TRANSMISSION
             RET               RETURN LEAVING SEND MESSAGE SYSREQ SET FOR RE1
RAKNAK       LXI    H,RESBUF   GET RESPONSE
             MVI    A,FIXCHR   CLOSE LINK FOR RESPONSE
             SIM
             CALL   RDATA
             LXI    H,RESBUF   SEE IF VALID RESPONSE
             MOV    A,M        MUST START WITH START CHAR
             CPI    STCHR
             RNZ
             MVI    C,2
RAK1         MOV    A,M        TEST IF RESPONSE IS ACK
             CPI    ACKCHR
             JZ     RACK
             CPI    BSYCHR     OR BUSY (LIKE MASTER HAS POWERED UP AFTER FAI)
             JZ     RACK
             INX    H
             DCR    C
             JNZ    RAK1
             MVI    A,BRKCHR   NO REC. RESP. SO MAKE SURE LINK IS BROKEN
             SIM
RNAK
             LDA    NAKS
             DCR    A          CHECK FOR TOO MANY NAKS
             STA    NAKS
             RNZ               RETURN WITH Z BIT RESET TO SHOW NAK
RACK         LDA    DEVADR     WHICH DEVICE IS DONE ?
             ANI    1
             JNZ    CLKEY
             STA    SYSREQ     EVEN ADDRESS IS CRT
             RET
CLKEY        XRA    A          ODD IS KEYBOARD
             STA    KEYMASK
             RET
*****************************************************
             DS     20
STACK        DS     2
NAKS         DS     1          NAK COUNT
TOADR        DS     1          ADDRESS TO SEND RESPONSE TO
TOADRKB      DS     1          ADDRESS TO SEND KEY TO
KEYMASK      DS     1          FLAG USED TO HANDLE KEY PROCESSING
RECDFV       DS     1          SAVE AREA FOR ADDRESSED RECEIVED AS DEVICES
DEVADR       DS     1          WHICH DEVICE SENDS DATA (CRT,KEYBOARD)
MESSAGE      DS     2          POINTER AT BUFFER OF DATA TO SEND
RESBUF       DS     3
KEYBUF       DS     3          BUFFER FOR KEY 0=LEN,1=STATUS 2=KEY
FROMAD       DS     0          FROM ADDRESS IN INPUT
INBUFF       DS     1          INPUT BUFFER
COMMAND      DS     1
DATA         DS     800
```

It will be apparent that many modifications and variations may be effected without departing from the scope of the novel concepts and teachings of the present invention.

What is claimed is:

1. In a node configuration for a loop processing network,
   (a) node processing means having processing input means and processing output means, and requiring at least one processing step in transmitting data between its processing input means and its processing output means, said node processing means being selectively operable for sending an information message,
   (b) incoming link path means for receiving information messages from a loop communications path, and outgoing link path means for transmitting information messages to a loop communications path,
   (c) node transmission link coupling means having a first coupling mode and a second decoupling mode,
   (d) said transmission link coupling means in said first coupling mode providing a coupling path directly coupling the incoming and outgoing link path means so as to provide for signal transmission independent of the node processing means, (e) said transmission link coupling means in said decoupling mode serving to attenuate said coupling path such that signals at the incoming link path means are effectively decoupled from the outgoing link path means except via the processing means, and (f) said node processing means having control means for placing said transmission link coupling means in the decoupling mode during the transmission of an information message from the node processing means, while assuring against a communications gap of a predetermined time duration during reception of a response to the transmitted information message.

2. In a node configuration according to claim 1, said node processing means having means for monitoring to detect a communications gap of a predetermined time duration during which there is an absence of signal transmission along the associated coupling path.

3. In a node configuration according to claim 2, said control means when said node processing means has a data message to transmit, being responsive to detection of a communcations gap of a predetermined time duration to shift the associated transmission link coupling means to decoupling mode, and to effect transmission of a bid message for seeking control of communication via the loop communications path.

4. In a node configuration according to claim 3, said control means after a successful bid has been made and after the data message has been sent, being operable upon receipt of a first part of a response to the data message to shift said transmission link coupling means to coupling mode, and being operable upon receipt of a further part of a response to shift said transmission link coupling means to decoupling mode so a to attenuate further signal propagation via the coupling path.

5. In a node configuration according to claim 1, said node processing means having an assigned address and said control means being operable in response to receipt of a data message with its assigned address to shift its transmission link coupling means to decoupling mode, to transmit a response, and to execute a time delay sufficient to ensure that a node processing means sending the data message has time to determine that a response is being sent, before shifting the transmission link coupling means to the coupling mode.

6. In a node configuration according to claim 1, said control means controlling said node processing means to recognize data messages directed thereto from other nodes and to respond thereto, said control means controlling said node processing means to respond to a data message directed thereto to shift the transmission link coupling means to decoupling mode, send the response, and execute a time delay of sufficient duration to prevent the response from traversing the loop communications path more than once.

7. In a node configuration for a loop processing network, (a) node processing means having processing input means and processing output means, and requiring at least one processing step in transmitting signals between its processing input means and processing output means, (b) incoming link path means and outgoing link path means coupled with the processing input means and the processing output means of the node processing means, respectively, (c) transmission link coupling means having a first coupling mode and a second decoupling mode, (d) said transmission link coupling means in said first coupling mode providing a coupling path directly coupling the incoming and outgoing link path means so as to provide for signal transmission independent of the node processing means, (e) said transmission link coupling means in said decoupling mode attenuating signal transmission along said coupling path such that the incoming and outgoing link path means are only effectively coupled via said node processing means, and (f) said transmission link coupling means being placed in decoupling mode during predetermined operations of the node processing means so as to insure that messages only traverse a loop communications path once, and (g) control means controlling said transmission link coupling means during a bidding operation in the transmission of bid messages for the purpose of seeking control of a loop communications path for the transmission of a desired information message, and controlling said transmission link coupling means for accommodating the transmission of messages from another mode without processing step delay when the bidding operation is not successful.

8. In a node configuration according to claim 7, logic means forming the transmission link coupling means and being controlled by the node processing means so as to place the logic means in a decoupling mode to interrupt the associated coupling path when the node processing means is operating as a bidding node and transmitting a bid message, and when the node processing means is acting as a recipient node and is transmitting a response.

9. In a node configuration according to claim 8, time delay means for delaying shifting of the logic means to coupling mode after a response has been transmitted, for a time interval sufficient to effect the blocking of the response from a second traverse of a loop communications path.

10. In a node configuration according to claim 8, further logic means having first input means connected to an output of the first mentioned logic means and having second input means connected with the processing output means of the node .processing means, the shifting of the first mentioned logic means to decoupling mode causing the supply of an enabling signal from an output of the first mentioned logic means to the first input means of the further logic means, thereby enabling said further logic means to transmit messages from the node processing means via the second input means of said further logic means, an output of said further logic means being connected with the outgoing link path means.

11. In a node configuration according to claim 7, first logic means having output means and forming the transmission link coupling means, second logic means having first input means connected to the output means of said first logic means and having second input means connected with the processing output means of the node processing means and having output means, the shifting of the first logic means to decoupling mode causing the supply of an enabling signal from the output means of the first logic means to the first input means of the second logic means so as to enable said second logic means via the second input means of said second logic means, the output means of said second logic means being connected with the outgoing link path means.

12. In a node configuration for a loop network wherein each node has node transmission link coupling means with a first coupling mode wherein signals are coupled from node input to node output without processing step delay, and with a second decoupling mode attenuating such coupling between the node input and node output,
(a) node processing means having processing input means for coupling with a node input for receiving signals from a loop network, and having processing output means for coupling with a node output for supplying signals to a loop network at a node therein, and
(b) control means controlling said node processing means to supply link coupling control signals for controlling transmission link coupling means at a node,
(c) said control means when the node processing means has a message to transmit, controlling said node processing means to monitor the processing input means to detect a communications gap of a predetermined duration in the transmission of messages about the loop network,
(d) said control means in response to detection of such a gap in the transmission of messages automatically controlling said node processing means to supply a link coupling control signal for shifting a transmission link coupling means to its second decoupling mode and controlling said node processing means to transmit a message to said processing output means, and
(e) said control means controlling said node processing means to maintain a transmission link coupling means in its second decoupling mode for a time duration sufficient to effectively attenuate the transmitted message after traverse of a loop network.

13. In a node configuration according to claim 12, said control means controlling said node processing means in the event of receipt of a message addressed thereto, to supply a link coupling control signal for shifting a transmission link coupling means to its second decoupling mode and to supply said processing output means with a response message without allowing a communications gap of a predetermined duration.

14. In a node configuration according to claim 13, said control means controlling said node processing means after transmission of a response message to execute a time delay before supplying a link coupling control signal to place a transmission link coupling means in its coupling mode, such time delay being sufficient to block the transmitted response message from a second traverse of a loop network.

15. In a node configuration according to claim 12, said control means controlling said node procesing means in the case of receipt of a message at said processor input means which is addressed thereto to transmit a following message to said processing output means without allowing a communications gap of a predetermined duration following such receipt.

16. In a node configuration according to claim 12, said control means controlling said node processing means to wait for a response to a data message therefrom and if a response is received at the processing input means to supply a link coupling control signal for shifting a transmission link coupling means to its first coupling mode so as to also effect transmission of part of such response without processing step delay, thereby to prevent the occurrence of a communications gap during receipt of the response.

17. In a node configuration according to claim 12, said control means controlling said node processing means, in the event of receipt of a message from another node at said processing input means but not addressed thereto, to supply a link coupling control signal for shifting a transmission link coupling means to its first coupling mode.

18. In a node configuration for a loop network,
(a) node processing means having node input port means for receiving signals from a loop network, and node output port means for supplying signals to a loop network at a node therein,
(b) node transmission link coupling means having a first coupling mode wherein a coupling path for signals from the node input port means to the node output port means of the node is provided with signal transmission independent of the node processing means, and having a second decoupling mode serving to attenuate said coupling path such that signals from the loop network are not effectively transmitted via said coupling path but incoming signals are transmissible from the node input port means to the node processing means, and outgoing signals are transmissible from the node processing means to the node output port means, and
(c) node control means at the node and operative when the node processing means has a message to transmit for automatically shifting the node transmission link coupling means to decoupling mode and effecting the transmission of a message from the node processing means,
(d) said node control means after transmitting a message maintaining said node transmission link coupling means in said decoupling mode for a time duration assuring that the transmitted message cannot be transmitted about a loop network more than once without effective attenuation.

19. In a closed loop data processing network,
(a) a series of nodes having data processing units associated therewith each having a data input and data output, and requiring at least one processing step in transmitting data between its data input and its data output,
(b) a series of communication links coupling the nodes in a loop communications path for enabling data communication therebetween, and including an incoming link path and an outgoing link path at each node, coupled with the data input and data output of the associated data processing unit, respectively,
(c) transmission link switches at the respective nodes each having a first transmission mode and a second cutoff mode,
(d) each transmission link switch in said first transmission mode providing a switch path directly coupling the incoming and outgoing link paths at the respective associated node so as to provide for undelayed data transmission independent of the data processing unit associated with the node,
(e) each transmission link switch in said cutoff mode serving to interrupt said switch path such that the incoming and outgoing link paths at the respective associated node are not coupled via said switch path but are only coupled via the data input and the data output of the associated data processing unit, and (f) each transmission link switch being placed in cutoff mode during predetermined operations of the data processing unit so as to insure that data messages only traverse the loop communications path once.

20. A closed loop data processing network according to claim 19, with logic means at each node forming the transmission link switch therefor and being controlled by the associated data processing unit so as to place the logic means in a blocking mode to interrupt the associated switch path when the data processing unit is operating as a bidding node and transmitting a bid message, and when the data processing unit is acting as a recipient node and is transmitting a response.

21. A closed loop data processing network according to claim 20, with time delay means for delaying shifting of a logic means to a nonblocking node after a response has been transmitted for a time interval sufficient to effect the blocking of the response from a second transverse of the loop path.

22. A closed loop data processing network according to claim 20, with further logic means at each node having a first input connected to the output of said first mentioned logic means and having a second input connected with the data output of the data processing unit at the node, the shifting of the first mentioned logic means to blocking mode causing the supply of an enabling signal from the output of the first mentioned logic means to the first input of the further logic means, thereby enabling said further logic means to transmit a data message from the data processing unit via the second input of said further logic means, the output of said further logic means being connected with the outgoing link path of the node.

23. A closed loop data processing network according to claim 19, with a first logic element at each node forming the transmission link switch therefor, a second logic element at each node having a first input connected to the output of said first logic element and having a second input connected with the data output of the data processing unit at the node, the shifting of the first logic element to cutoff mode causing the supply of an enabling signal from the output of the first logic element to the first input of the second logic element, thereby enabling said second logic element to transmit a data message from the data processing unit via the second input of said second logic element, the output of said second logic element being connected with the outgoing link path of the node.

24. The method of effecting communication between nodes of a loop communication path, wherein each node includes a transmission link switch which when in a first mode completes a link of the loop communication path and when in a second mode prevents an undelayed complete loop transmission, said method comprising (a) at a mode desiring to initiate communication
  (a1) monitoring the loop communication path for a gap in communication along the loop communication path of a defined time span,
  (a2) and upon detection of such a communication gap shifting the transmission link switch at the node to its second mode, and
  (a3) transmitting a bid message in a given direction about the loop communication path from the node, which becomes a bidding node, (b) at the bidding node monitoring the loop communication path for the bid message as an indication of a successful bid, (c) upon a succesful bid at a bidding node, transmitting a data message intended for at least one recipient node from the bidding node via the loop communication path while the transmission link switch of the bidding node is in the second mode, (d) at a recipient node upon receipt of the data message
  (d1) placing its transmission link switch in the second mode, and
  (d2) transmitting a response via the loop communication path, and (e) operating the transmission link switches at the recipient node and at the bidding node so as to prevent repeated circulation of the response while avoiding the appearance of a communication gap at the other nodes during transmission of the response from the recipient node to the bidding node.

* * * * *